(12) United States Patent
Lin et al.

(10) Patent No.: US 12,446,077 B2
(45) Date of Patent: Oct. 14, 2025

(54) METHOD AND APPARATUS FOR RANDOM ACCESS

(71) Applicant: Telefonaktiebolaget LM Ericsson (publ), Stockholm (SE)

(72) Inventors: Zhipeng Lin, Nanjing (CN); Robert Mark Harrison, Grapevine, TX (US); Krishna Chitti, Lund (SE); Andres Reial, Lomma (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 754 days.

(21) Appl. No.: 17/632,844

(22) PCT Filed: Jul. 20, 2020

(86) PCT No.: PCT/CN2020/103070
§ 371 (c)(1),
(2) Date: Feb. 4, 2022

(87) PCT Pub. No.: WO2021/027497
PCT Pub. Date: Feb. 18, 2021

(65) Prior Publication Data
US 2022/0304075 A1    Sep. 22, 2022

(51) Int. Cl.
*H04W 74/0833* (2024.01)
*H04L 1/08* (2006.01)
(Continued)

(52) U.S. Cl.
CPC .......... *H04W 74/0841* (2013.01); *H04L 1/08* (2013.01); *H04W 72/0446* (2013.01);
(Continued)

(58) Field of Classification Search
CPC ......... H04W 74/0841; H04W 72/0446; H04W 72/0453; H04W 74/0866; H04W 74/0833; H04L 1/08
See application file for complete search history.

(56) References Cited

U.S. PATENT DOCUMENTS

| 10,405,342 B2 | 9/2019 | Wang et al. |
| 10,986,670 B2 | 4/2021 | Ren et al. |

(Continued)

FOREIGN PATENT DOCUMENTS

| CN | 107872899 A | 4/2018 |
| CN | 108282897 A | 7/2018 |

(Continued)

OTHER PUBLICATIONS

3rd Generation Partnership Project, "3rd Generation Partnership Project; Technical Specification Group Radio Access Network; NR; Physical layer procedures for control (Release 15)", Technical Specification, 3GPP TS 38.213 V15.6.0, Jun. 1, 2019, pp. 1-107, 3GPP.

ZTE Corporation et al., "New work item: 2-step RACH for NR", 3GPP TSG RAN Meeting #82, Sorrento, Italy, Dec. 10, 2018, pp. 1-5, RP-182894, 3GPP.

(Continued)

*Primary Examiner* — Austin J Moreau
(74) *Attorney, Agent, or Firm* — COATS & BENNETT, PLLC

(57) ABSTRACT

Various embodiments of the present disclosure provide a method for random access. The method which may be performed by a terminal device comprises performing a transmission of a message to a network node in a random access procedure. The transmission of the message may comprise transmission of a preamble and transmission of a payload on a shared channel. The method further comprises receiving a response message from the network node. In response to the response message, the terminal device may perform a retransmission of the payload on the shared channel to the network node according to retransmission configuration.

11 Claims, 15 Drawing Sheets

(51) Int. Cl.
  *H04W 72/0446* (2023.01)
  *H04W 72/0453* (2023.01)
  *H04W 74/08* (2024.01)
  *H04W 74/0836* (2024.01)

(52) U.S. Cl.
  CPC ... *H04W 72/0453* (2013.01); *H04W 74/0833* (2013.01); *H04W 74/0866* (2013.01); *H04W 74/0836* (2024.01)

(56) References Cited

U.S. PATENT DOCUMENTS

| | | | |
|---|---|---|---|
| 11,089,629 | B2 | 8/2021 | Zhang et al. |
| 2020/0252973 | A1* | 8/2020 | Zhang ............... H04W 76/18 |
| 2021/0153259 | A1* | 5/2021 | Wu .................. H04L 1/1864 |
| 2022/0086915 | A1* | 3/2022 | Canonne-Velasquez ............... H04B 7/0695 |
| 2022/0183071 | A1 | 6/2022 | Liu |

FOREIGN PATENT DOCUMENTS

| | | |
|---|---|---|
| CN | 109892000 A | 6/2019 |
| CN | 110115096 A | 8/2019 |
| WO | 2018175809 A1 | 9/2018 |

OTHER PUBLICATIONS

ZTE, "Summary of 7.2.1.1 Channel Structure for Two-step RACH", 3GPP TSG RAN WG1 #96bis, Xi'an, China, Apr. 8, 2019, pp. 1-36, R1-1905667, 3GPP.

CMCC, "Discussion on Procedure for 2-step RACH", 3GPP TSG RAN WG1 #97, Reno, USA, May 13, 2019, pp. 1-7, R1-1906512, 3GPP.

ZTE Corporation et al., "Msg2 payload contents for 2-step RACH", 3GPP TSG-RAN WG2 Meeting #104, Spokane, USA, Nov. 12, 2018, pp. 1-9, R2-1817064, 3GPP.

3rd Generation Partnership Project, "3rd Generation Partnership Project; Technical Specification Group Radio Access Network; NR; Medium Access Control (MAC) protocol specification (Release 15)", 3GPP TS 38.321 V15.6.0 (Jun. 2019), Technical Specification, pp. 1-78.

Fijitsu, "On recognition of msgB or msg2", 3GPP TSG-RAN WG2 Meeting #106, Reno, USA, May 13-17, 2019, R2-1906257 Revision of R2-1903783, pp. 1-3.

LG Electronics Inc., "Fall back procedure to 4-step RACH", 3GPP TSG-RAN WG2 Meeting #106, Reno, USA, May 13-17, 2019, R2-1906570, pp. 1-2.

Huawei, et al., "Discussion on the MsgA transmission", 3GPP TSG-RAN WG2 #106, Reno, US, May 13-17, 2019, R2-1907726, pp. 1-3.

Qualcomm Incorporated, "2-step RACH fall back to 4-step Rach", 3GPP TSG-RAN WG2 Meeting #106, Reno, Nevada, US, May 13-17, 2019, R2-190790 Revision of R2-1904971, pp. 1-3.

* cited by examiner

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

PUSCH Occasion

PUSCH RU: {DMRS$_{k,0}$},{DMRS$_{k,1}$}

METHOD AND APPARATUS FOR RANDOM ACCESS

FIELD OF THE INVENTION

The present disclosure generally relates to communication networks, and more specifically, to a method and apparatus for random access.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to connect to a network node, a random access (RA) procedure may be initiated for a terminal device. In the RA procedure, system information (SI) and synchronization signals (SS) as well as the related radio resource and transmission configuration can be informed to the terminal device by control information from the network node. The RA procedure can enable the terminal device to establish a session for a specific service with the network node.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as a 5G/NR network may be able to support flexible network configuration. Various signaling approaches (e.g., a four-step approach, a two-step approach, etc.) may be used for a RA procedure of a terminal device to set up a connection with a network node. In a two-step RA procedure, the terminal device can transmit a RA preamble together with the physical uplink shared channel (PUSCH) in a message (which is also known as message A or msgA for short) to the network node, and receive a response message (which is also known as message B or msgB for short) from the network node. The msgA PUSCH can be transmitted in a PUSCH occasion (PO) configured with one or more resource units (RUs), and the RA preamble can be transmitted in a time-frequency physical random access channel (PRACH) occasion (which is also known as a RA occasion or RO for short). In the case that the network node does not receive the initial transmission of msgA completely, the terminal device may perform one or more retransmissions of msgA to retry session establishment with the network node. An effective design of resource allocation for different transmissions of msgA may potentially improve RA performance for the terminal device. Therefore, it may be desirable to configure different transmissions of msgA in a RA procedure more flexibly and efficiently.

Various embodiments of the present disclosure propose a solution for RA, which can support adaptive transmission configuration for a RA procedure such as a two-step RA procedure, for example, by enabling resource allocation for different transmissions of msgA according to dynamic or non-dynamic scheduling, so as to increase configuration flexibility of msgA transmission and improve performance of the RA procedure.

It can be realized that the terms "PRACH occasion", "random access channel (RACH) occasion" or "RA occasion" mentioned herein refers to a time-frequency resource usable for the preamble transmission in a RA procedure, which may also be referred to as "random access occasion (RO)". These terms may be used interchangeably in this document.

Similarly, it can be realized that the terms "PUSCH occasion", "uplink shared channel occasion" or "shared channel occasion" mentioned herein refers to a time-frequency resource usable for PUSCH transmission in a RA procedure, which may also be referred to as "physical uplink shared channel occasion (PO)". These terms may be used interchangeably in this document.

According to a first aspect of the present disclosure, there is provided a method performed by a terminal device such as a user equipment (UE). The method may comprise performing first transmission of a message to a network node in a RA procedure. The first transmission of the message may comprise transmission of a first preamble and transmission of a shared channel. The method may further comprise receiving from the network node, a retransmission request for second transmission of the message to the network node in the RA procedure according to retransmission configuration.

In accordance with some exemplary embodiments, the retransmission request may be received on at least one of a downlink shared channel and a downlink control channel.

In accordance with some exemplary embodiments, the method according to the first aspect of the present disclosure may further comprise: performing the second transmission of the message to the network node in response to the retransmission request.

In accordance with some exemplary embodiments, the second transmission of the message may comprise at least retransmission of the shared channel.

In accordance with some exemplary embodiments, the shared channel may comprise a physical uplink shared channel (PUSCH).

In accordance with some exemplary embodiments, the message may be message A (or msgA for short) in a two-step RA procedure.

In accordance with some exemplary embodiments, the retransmission configuration may comprise resource configuration indicated by at least one of: predetermined configuration information for the terminal device, radio resource control (RRC) signaling for the terminal device, and the retransmission request.

In accordance with some exemplary embodiments, the retransmission configuration may be different from configuration for the first transmission of the message.

In accordance with some exemplary embodiments, the retransmission configuration may indicate at least one of:
  a redundancy version (RV);
  a preamble identifier;
  a random access channel time-frequency resource;
  a shared channel time-frequency resource;
  a demodulation reference signal (DMRS) identifier;
  a modulation and coding scheme (MCS); and
  transmission power.

In accordance with some exemplary embodiments, the retransmission request may be one of one or more responses included in a response message from the network node.

In accordance with some exemplary embodiments, the one or more responses may be intended for one or more terminal devices, respectively.

In accordance with some exemplary embodiments, the retransmission request may comprise an identifier of the first preamble.

In accordance with some exemplary embodiments, the retransmission request may comprise information about a radio network temporary identifier (RNTI) to indicate retransmission of the shared channel.

In accordance with some exemplary embodiments, the RNTI may be based at least in part on RRC status of the terminal device.

According to a second aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus may comprise a transmitting unit and a receiving unit. In accordance with some exemplary embodiments, the transmitting unit is operable to carry out at least the step of performing the first transmission of the message in the method according to the first aspect of the present disclosure. The receiving unit is operable to carry out at least the receiving step in the method according to the first aspect of the present disclosure.

According to a fifth aspect of the present disclosure, there is provided a method performed by a network node such as a base station. The method may comprise receiving, at least partly, first transmission of a message from a terminal device in a RA procedure. The first transmission of the message may comprise transmission of a first preamble and transmission of a shared channel. The method may further comprise transmitting to the terminal device, a retransmission request for second transmission of the message from the terminal device to the network node in the RA procedure according to retransmission configuration.

In accordance with some exemplary embodiments, the retransmission request may be transmitted on at least one of a downlink shared channel and a downlink control channel.

In accordance with some exemplary embodiments, the method according to the fifth aspect of the present disclosure may further comprise: receiving the second transmission of the message from the terminal device in response to the retransmission request.

According to a sixth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus may comprise a receiving unit and a transmitting unit. In accordance with some exemplary embodiments, the receiving unit is operable to carry out at least the receiving step in the method according to the fifth aspect of the present disclosure. The transmitting unit is operable to carry out at least the transmitting step in the method according to the fifth aspect of the present disclosure.

According to a ninth aspect of the present disclosure, there is provided a method performed by a terminal device such as a UE. The method may comprise performing first transmission of a message to a network node in a RA procedure. The first transmission of the message may comprise transmission of a first preamble and transmission of a shared channel. The method may further comprise performing second transmission of the message to the network node in the RA procedure. The second transmission of the message may comprise at least retransmission of the shared channel. According to some exemplary embodiments, the first transmission and the second transmission of the message may be associated with a first transmission property and a second transmission property, respectively.

In accordance with some exemplary embodiments, the association between the first transmission of the message and the first transmission property, and the association between the second transmission of the message and the second transmission property may be indicated by at least one of: system information, RRC signaling for the terminal device, and pre-configuration information for the terminal device.

In accordance with some exemplary embodiments, the first transmission property and the second transmission property may be associated with resource configurations for the first transmission and the second transmission of the message, respectively.

In accordance with some exemplary embodiments, the second transmission property may be based at least in part on the first transmission property.

In accordance with some exemplary embodiments, the first transmission property and the second transmission property may be related to at least one of: scrambling of shared channel transmission, and a DMRS sequence.

In accordance with some exemplary embodiments, the shared channel may comprise a PUSCH.

According to a tenth aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a terminal device. The apparatus may comprise a first transmitting unit and a second transmitting unit. In accordance with some exemplary embodiments, the first transmitting unit is operable to carry out at least the step of performing the first transmission of the message in the method according to the ninth aspect of the present disclosure. The second transmitting unit is operable to carry out at least the step of performing the second transmission of the message in the method according to the ninth aspect of the present disclosure.

According to a thirteenth aspect of the present disclosure, there is provided a method performed by a network node such as a base station. The method may comprise receiving first transmission of a message from a terminal device in a RA procedure. The first transmission of the message may comprise transmission of a first preamble and transmission of a shared channel. The method may further comprise receiving second transmission of the message from the terminal device in the RA procedure. The second transmission of the message may comprise at least retransmission of the shared channel. According to some exemplary embodiments, the first transmission and the second transmission of the message may be associated with a first transmission property and a second transmission property, respectively.

In accordance with some exemplary embodiments, the method according to the thirteenth aspect of the present disclosure may further comprise: combining the reception of the first transmission and the reception of the second transmission, based at least in part on the first transmission property and the second transmission property.

According to a fourteenth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a network node. The apparatus may comprise a first receiving unit and a second receiving unit. In accordance with some exemplary embodiments, the first receiving unit is operable to carry out at least the step of receiving the first transmission of the message in the method according to the thirteenth aspect of the present disclosure. The second receiving unit is operable to carry out at least the step of receiving the second transmission of the message in the method according to the thirteenth aspect of the present disclosure.

According to a seventeenth aspect of the present disclosure, there is provided a method performed by a terminal device such as a UE. The method may comprise performing a transmission of a message to a network node in a RA procedure. The transmission of the message may comprise transmission of a preamble and transmission of a payload on a shared channel. In accordance with an exemplary embodiment, the method may further comprise: receiving a response message from the network node, and performing a retransmission of the payload on the shared channel to the network node in response to the response message. The retransmission may be according to retransmission configuration.

In accordance with some exemplary embodiments, the response message may be received on a downlink shared channel.

In accordance with some exemplary embodiments, the retransmission configuration may comprise resource configuration indicated by at least one of: predetermined configuration information for the terminal device, and the response message.

In accordance with some exemplary embodiments, the retransmission configuration may be different from configuration for the transmission of the message.

In accordance with some exemplary embodiments, the retransmission configuration may indicate at least one of: a RV, a preamble identifier, and a shared channel time-frequency resource.

In accordance with some exemplary embodiments, the response message may include one or more responses.

In accordance with some exemplary embodiments, the one or more responses may be intended for one or more terminal devices, respectively.

In accordance with some exemplary embodiments, the response message may comprise an identifier of the preamble.

In accordance with some exemplary embodiments, the response message may comprise information about a RNTI to indicate the retransmission of the payload on the shared channel.

In accordance with some exemplary embodiments, the shared channel may comprise a PUSCH.

In accordance with some exemplary embodiments, the response message may comprise a fallback random access response (RAR).

According to an eighteenth aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the seventeenth aspect of the present disclosure.

According to a nineteenth aspect of the present disclosure, there is provided a computer-readable medium having computer program codes embodied thereon which, when executed on a computer, cause the computer to perform any step of the method according to the seventeenth aspect of the present disclosure.

According to a twentieth aspect of the present disclosure, there is provided an apparatus which may be implemented as a terminal device. The apparatus may comprise a transmitting unit and a receiving unit. In accordance with some exemplary embodiments, the transmitting unit is operable to carry out at least the step of performing the transmission of the message and/or the step of performing the retransmission of the payload on the shared channel in the method according to the seventeenth aspect of the present disclosure. The receiving unit is operable to carry out at least the receiving step in the method according to the seventeenth aspect of the present disclosure.

According to a twenty-first aspect of the present disclosure, there is provided a method performed by a network node such as a base station. The method may comprise receiving, at least partly, a transmission of a message from a terminal device in a RA procedure. The transmission of the message may comprise transmission of a preamble and transmission of a payload on a shared channel. In accordance with an exemplary embodiment, the method may further comprise: transmitting a response message to the terminal device, and receiving a retransmission of the payload on the shared channel from the terminal device in response to the response message. The retransmission may be according to retransmission configuration.

In accordance with some exemplary embodiments, the response message may be transmitted on a downlink shared channel.

According to a twenty-second aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the twenty-first aspect of the present disclosure.

According to a twenty-third aspect of the present disclosure, there is provided a computer-readable medium having computer program codes embodied thereon which, when executed on a computer, cause the computer to perform any step of the method according to the twenty-first aspect of the present disclosure.

According to a twenty-fourth aspect of the present disclosure, there is provided an apparatus which may be implemented as a network node. The apparatus may comprise a receiving unit and a transmitting unit. In accordance with some exemplary embodiments, the receiving unit is operable to carry out at least the receiving step(s) in the method according to the twenty-first aspect of the present disclosure. The transmitting unit is operable to carry out at least the transmitting step in the method according to the twenty-first aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
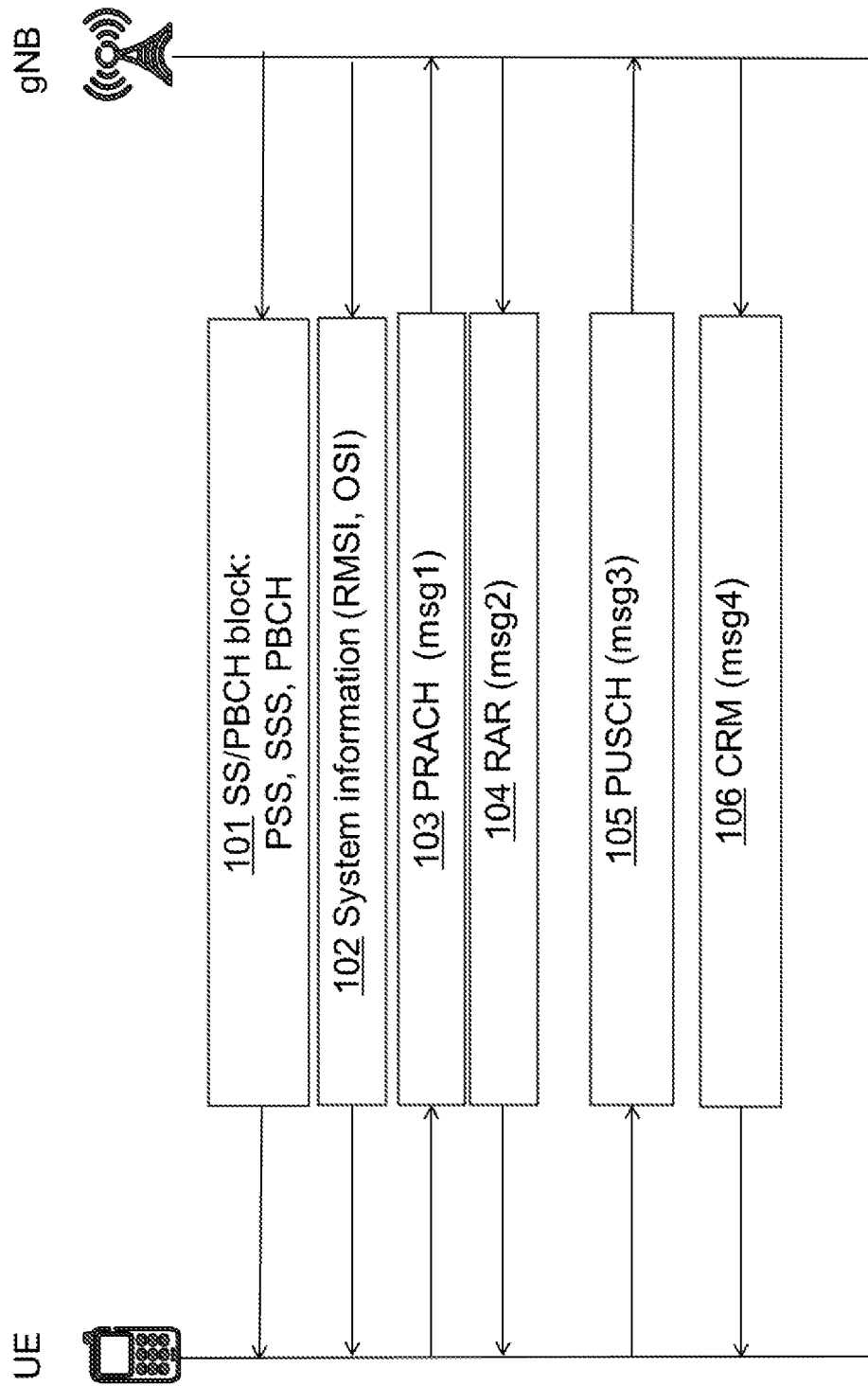
FIG. 1A is a diagram illustrating an exemplary four-step RA procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a network node such as a gNB in a wireless communication network, a terminal device such as a UE may need to perform a RA procedure to exchange essential information and messages for communication link establishment with the network node.

FIG. 1A is a diagram illustrating an exemplary four-step RA procedure according to an embodiment of the present disclosure. As shown in FIG. 1A, a UE can detect a synchronization signal (SS) by receiving 101 a synchronization signal and physical broadcast channel block (which is also known as a SS/PBCH block or SSB for short) from a gNB, for example, including a primary synchronization signal (PSS), a secondary synchronization signal (SSS), and a physical broadcast channel (PBCH). The UE can decode 102 some system information (e.g., remaining minimum system information (RMSI) and other system information (OSI)) broadcasted in the downlink (DL). Then the UE can transmit 103 a PRACH preamble (message1/msg1) in the uplink (UL). The gNB can reply 104 with a random access response (RAR, message2/msg2). In response to the RAR from the gNB, the UE can transmit 105 the UE's identification information (message3/msg3) on PUSCH. Then the gNB can send 106 a contention resolution message (CRM, message4/msg4) to the UE. In some cases, the PRACH preamble (message1/msg1) may be reattempted by the UE and different preambles can be selected for the initial transmission and its subsequent retransmission(s). Parameters such as PREAMBLE_TRANSMISSION_COUNTER and PREAMBLE_POWER_RAMPING_COUNTER can be maintained on UE side for different transmissions of the preambles.

In the exemplary procedure shown in FIG. 1A, the UE can transmit message3/msg3 on PUSCH after receiving a timing advance command in the RAR, allowing message3/msg3 on PUSCH to be received with timing accuracy within a cyclic prefix (CP). Without this timing advance, a very large CP may be needed in order to be able to demodulate and detect message3/msg3 on PUSCH, unless the communication system is applied in a cell with very small distance between the UE and the gNB. Since a NR system can also support larger cells with a need for providing a timing advance command to the UE, the four-step approach is needed for the RA procedure.

Figure 1B:
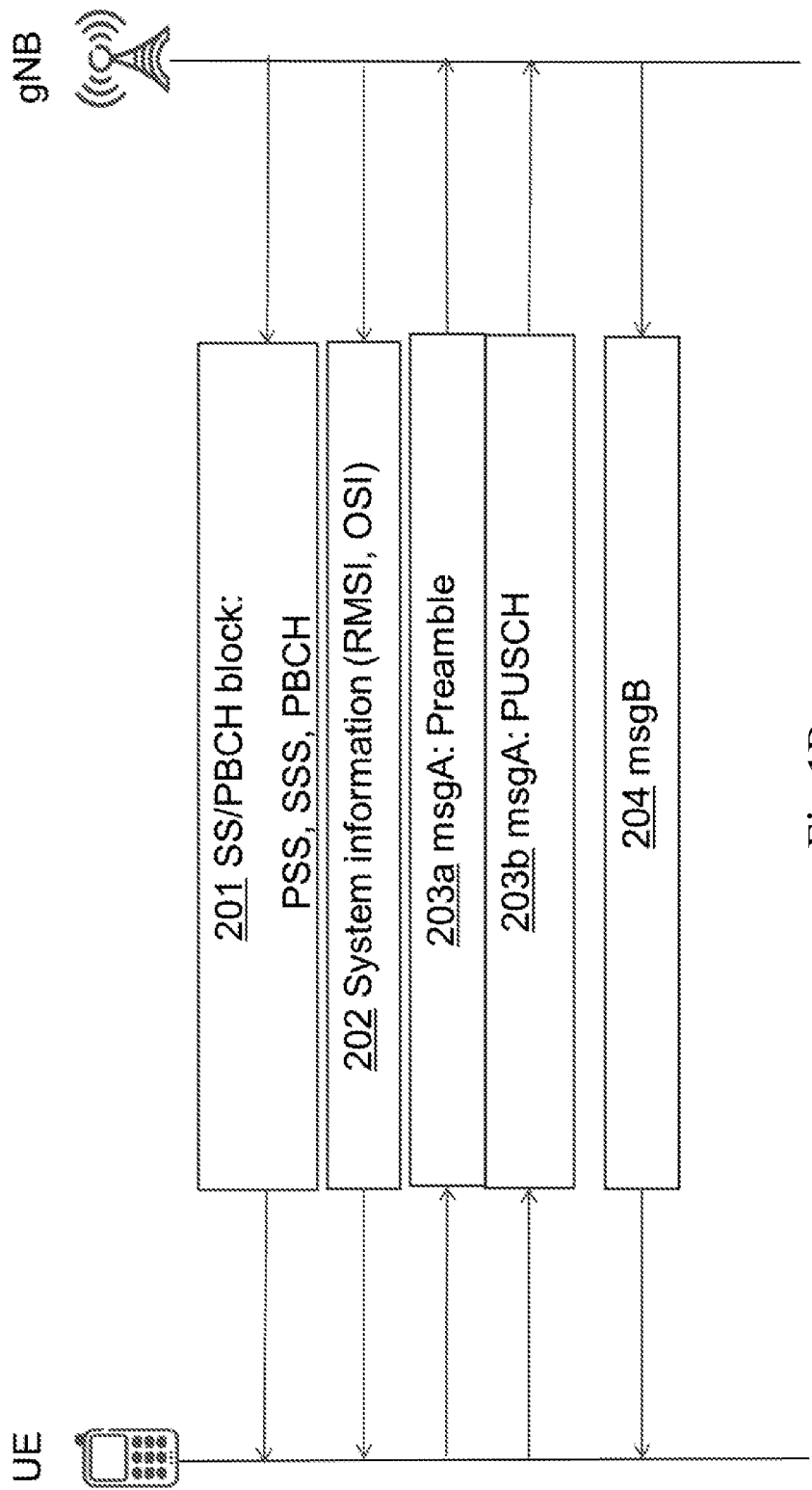
FIG. 1B is a diagram illustrating an exemplary two-step RA procedure according to an embodiment of the present disclosure.

FIG. 1B is a diagram illustrating an exemplary two-step RA procedure according to an embodiment of the present disclosure. Similar to the procedure as shown in FIG. 1A, in the procedure shown in FIG. 1B, a UE can detect a SS by receiving 201 an SS/PBCH block (e.g., comprising PSS, SSS and PBCH) from a gNB, and decode 202 system information (e.g., comprising RMSI and OSI) broadcasted in the DL. Compared to the four-step RA procedure as shown in FIG. 1A, the UE performing the procedure in FIG. 1B can complete random access in only two steps. Firstly, the UE sends 203a/203b to the gNB a message A (msgA) including RA preamble together with higher layer data such as a radio resource control (RRC) connection request possibly with some small payload on PUSCH. Secondly, the gNB sends 204 to the UE a RAR (also called message B or msgB) including UE identifier assignment, timing advance information, a contention resolution message, and etc.

Figures 2A, 2B:
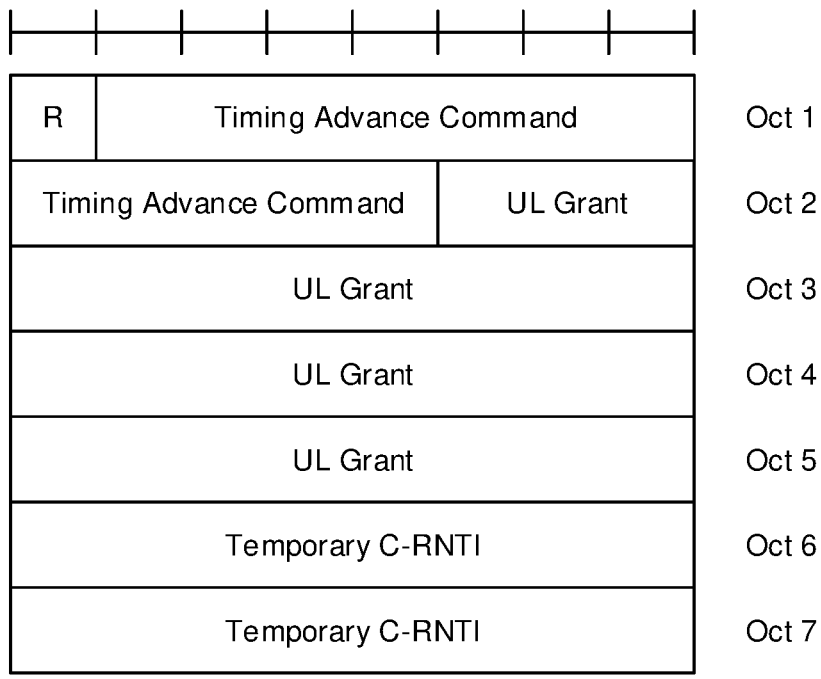
FIGS. 2A-2B are diagrams illustrating an exemplary random access response (RAR) according to some embodiments of the present disclosure.

FIGS. 2A-2B are diagrams illustrating an exemplary RAR according to some embodiments of the present disclosure. In a RA procedure as illustrated in FIG. 1A or FIG. 1B, a gNB may transmit a RAR to a UE, for example, in response to reception of msg1 or msgA. As shown in FIG. 2A, an exemplary medium access control (MAC) RAR with 7 octets may have some fields or bits (which are represented by R, Timing Advance Command, UL Grant, Temporary C-RNTI (cell-radio network temporary identifier) in FIG. 2A) to indicate UL scheduling configuration of the UE. FIG. 2B shows some exemplary RAR grant fields such as 1-bit frequency hopping flag field, 14-bit PUSCH frequency resource allocation field, 4-bit PUSCH time resource allocation field, 4-bit modulation and coding scheme (MCS) field, 3-bit transmission power control (TPC) command for PUSCH field, and 1-bit channel state information (CSI) request field. It can be appreciated that the structure and configuration of the RAR shown in FIGS. 2A-2B are just as examples, and other suitable structure and configuration (e.g., different contents, parameters, sizes, and/or more or less fields, etc.) may also be applicable to exemplary embodiments of the present disclosure.

In the two-step RA procedure as shown in FIG. 1B, the msgA preamble and msgA PUSCH (also called msgA payload) can be transmitted by the UE in one message called message A. The msgA preamble may be transmitted in time-frequency resource locations referred to as PRACH occasions, and the msgA PUSCH may be transmitted in time-frequency resource locations referred to as PUSCH occasions. The number of preambles (e.g., one or multiple preambles) mapped to one PUSCH resource unit (RU) may be configurable. A PUSCH RU can be defined as the PUSCH occasion (PO) and at least one of demodulation reference signal (DMRS) port and DMRS sequence usable for the msgA payload transmission. The PUSCH RU may occupy a contiguous set of subcarriers and symbols.

Figures 3A, 3B:
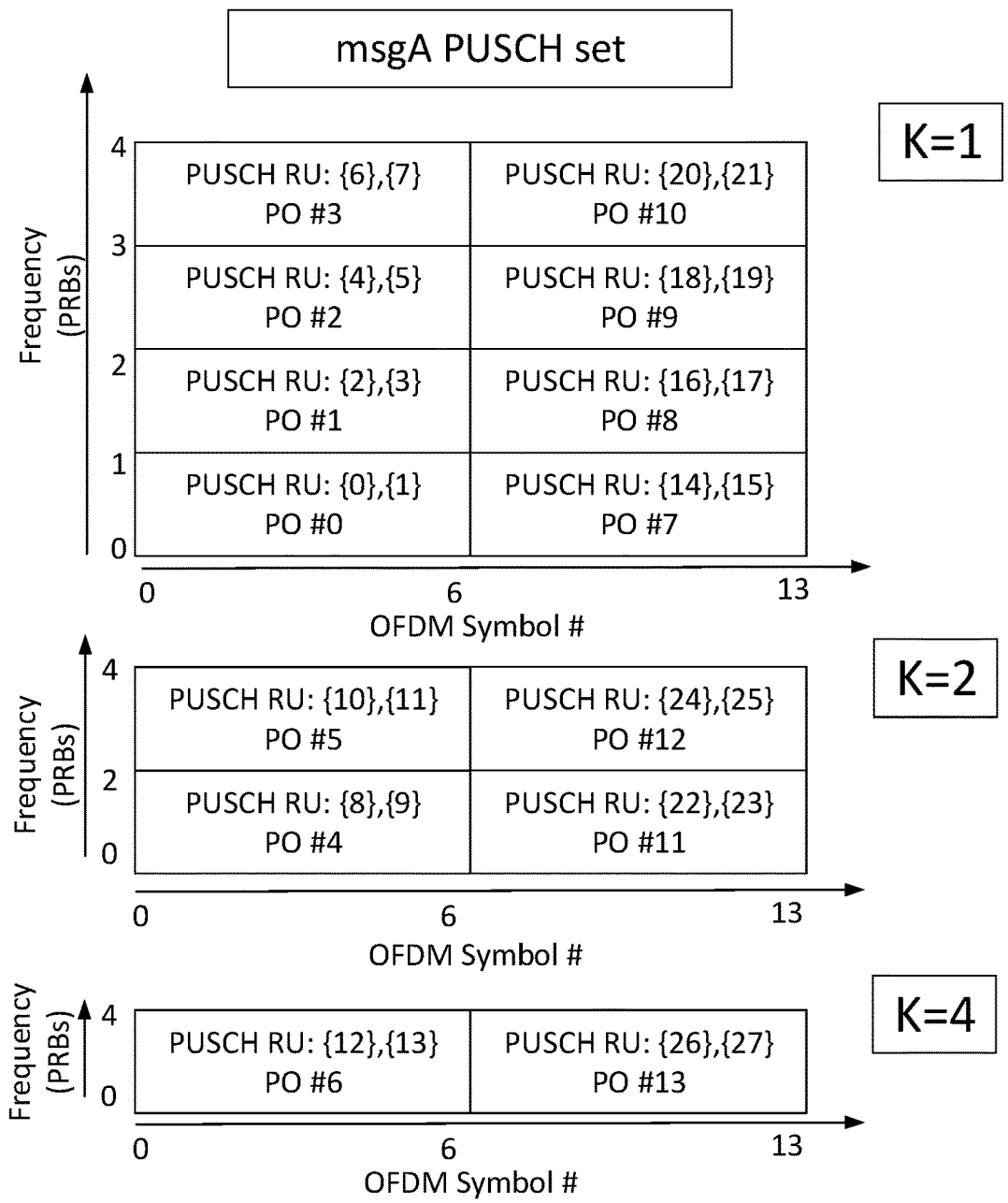
FIG. 3A is a diagram illustrating an exemplary PUSCH occasion according to some embodiments of the present disclosure.
FIG. 3B is a diagram illustrating an exemplary msgA PUSCH set according to some embodiments of the present disclosure.

FIG. 3A is a diagram illustrating an exemplary PUSCH occasion according to some embodiments of the present disclosure. As shown in FIG. 3A, there may be two PUSCH RUs in a PUSCH occasion, each PUSCH RU corresponding to a DMRS port and/or a DMRS sequence, which are indicated by $\{DMRS_{k,0}\}$ and $\{DMRS_{k,1}\}$. The PUSCH RUs corresponding to a PUSCH occasion may have 'K' physical radio block(s). The parameter K can vary (which will be described hereafter in connection with FIG. 3B), and a given physical radio block (PRB) may correspond to the PUSCH RUs with different sizes. Considering an association between a preamble and a PUSCH RU, the parameter K can be identified by which preamble is used. Optionally, there may be a guard band (in PRBs) or guard time for a PUSCH occasion. A set of resources containing multiple PUSCH occasions can be defined as a msgA PUSCH set.

FIG. 3B is a diagram illustrating an exemplary msgA PUSCH set according to some embodiments of the present disclosure. As shown in FIG. 3B, the msgA PUSCH set may comprise a set of PUSCH RUs and correspondingly contain multiple PUSCH occasions (POs) contiguous in frequency and in time (including guard band or period if defined). Optionally, frequency hopping may be supported by configuration of the msgA PUSCH set. According to an exemplary embodiment, the msgA PUSCH set may occur periodically and have a known length in symbols and position in frequency. Multi-user multiple-input multiple-output (MU-MIMO) reception can be supported in some implementations.

In the exemplary msgA PUSCH set, the POs may have different sizes, for example, corresponding to K=1, K=2 and K=4. As shown in FIG. 3B, for the case of K=1, each PO occupies 1 PRB in frequency and 6 orthogonal frequency division multiplexing (OFDM) symbols. Similarly, for the case of K=2, each PO occupies 2 PRBs in frequency and 6 OFDM symbols, while for the case of K=4, each PO occupies 4 PRBs in frequency and 6 OFDM symbols.

As an exemplary and non-limiting embodiment, the msgA PUSCH set shown in FIG. 3B comprises fourteen POs, which are represented by PO #0 through PO #13. Each PO contains two PUSCH RUs, for example, PUSCH RUs {6} and {7} in PO #3, PUSCH RUs {10} and {11} in PO #5, PUSCH RUs {12} and {13} in PO #6, etc. A PUSCH RU may be associated with a distinct DMRS transmission. The distinct DMRS transmission can be a DMRS antenna port, a DMRS with a different sequence initialization (or equivalently a different DMRS scrambling identifier (ID)), or a combination of a DMRS antenna port and a DMRS sequence initialization. As an example, if a PRB corresponds the PUSCH RUs with size K, the DMRS (or PUSCH RU) index or identifier may be a function of this size. According to an exemplary embodiment, the total number of DMRS (or PUSCH RUs) can be calculated as the product of the number of POs and the number of PUSCH RUs per PO. Optionally, a UE can randomly select a PUSCH RU with index 'n' out of the configured msgA PUSCH set to perform a RA procedure.

It can be appreciated that the configuration for PUSCH occasion and the PUSCH RUs as shown in FIG. 3A or FIG. 3B is just as an example, and other suitable configuration (e.g., different values of K, and/or more or less PUSCH RUs in one PUSCH occasion) can also be implemented according to a proper criterion.

In accordance with some exemplary embodiments, there may be a number of POs/PUSCH RUs associated with the same PRACH occasion, for example, frequency-multiplexed POs/PUSCH RUs. Furthermore, similar to PRACH resources/occasions, POs and PUSCH RUs may be periodic in nature and hence the same PO/PUSCH RU may reoccur periodically. For ease of illustration, a set of N (where N ∈{2, 3, 4 . . . }) consecutive POs/PUSCH RUs may be referred to as a series of POs/PUSCH RUs.

In accordance with some exemplary embodiments, a series of PUSCH occasions or PUSCH resource units (POs or PUSCH RUs) may be defined as a finite or infinite sequence of cyclically/periodically recurring POs/PUSCH RUs, where the POs/PUSCH RUs in the series may have the same properties and parameter values (such as frequency resources for POs and also DMRS sequence/port configuration for PUSCH RUs, etc.) except for the time resource. The POs/PUSCH RUs in the series may recur in cycles, where each PO/PUSCH RU cycle may contain one or more POs/PUSCH RUs. In the case that a PO/PUSCH RU cycle contains multiple POs/PUSCH RUs, the POs/PUSCH RUs in the cycle may be spaced apart in time with unequal time distances. For instance, a PO/PUSCH RU cycle may contain two rather densely allocated POs/PUSCH RUs followed by a longer time period without POs/PUSCH RUs until the next PO/PUSCH RU cycle begins. In some cases, two POs/PUSCH RUs separated in time by a PO/PUSCH RU cycle may still have a common time related property, e.g., in terms of system frame number (SFN) modulo TPO/PUSCH_RU (where TPO/PUSCH_RU is the PO/PUSCH RU cycle length in radio frames) or in terms of the location of the time resource(s) in relation to another relevant reference, such as a PRACH occasion or an SSB.

In accordance with some exemplary embodiments, a retransmission of msgA may be performed by a UE, for example, in response that an initial transmission of msgA is not received successfully and completely by a gNB. The retransmission of msgA can be supported by a retransmission of msgA PRACH (e.g., with a re-selection of preamble) and/or msgA PUSCH. There may be some options for the msgA retransmission, for example, using the same or different payload for msgA PUSCH. Under certain conditions, a UE can perform msgA retransmission, for example, by retrying it on two-step RACH.

In order to perform msgA retransmission in two-step RA, it may be needed to determine the radio resources used for the msgA retransmission. The determination may depend on whether a dynamic grant for msgA PUSCH (even the preamble part) or the reserved msgA PUSCH resource is to be used. Unlike the msg1 retransmissions that are one-shot in nature, the msgA resource (at least msgA PUSCH resource) used in the retransmission for a UE may need to be known by a gNB, for example, in order to perform soft combining between different msgA transmissions. Therefore, it may be desirable to determine resource configuration for the msgA retransmission in two-step RA.

Various exemplary embodiments of the present disclosure propose a solution for RA, which can enable different transmissions (e.g., including both initial transmission and retransmissions) of msgA to be performed by a UE according to dynamical resource configuration (e.g., in the case that a scheduling message is sent by a gNB in response to msgA) and/or non-dynamical resource configuration (e.g., in the case of pre-configuration for the UE without dynamic grant), so that different transmissions of msgA in a RA procedure can be performed with enhanced resource utilization and improved transmission efficiency and flexibility.

In accordance with some exemplary embodiments, the retransmission of msgA may comprise a retransmission of:
both msgA preamble and msgA PUSCH; or
msgA PUSCH only (e.g., if the preamble is detected by the gNB and a response message is transmitted by the gNB and received by the UE).

In accordance with some exemplary embodiments, the resources configurable or available for different transmissions of msgA may comprise but not limited to the following:
msgA preamble including a preamble ID, a RACH occasion;
msgA PUSCH time/frequency resource;
msgA PUSCH DMRS sequence;
msgA PUSCH DMRS port;
msgA PUSCH redundancy version (RV);
msgA PUSCH modulation and coding scheme (MCS); and/or
msgA transmission power.

According to some exemplary embodiments, the determination of the resources to be used by msgA between different transmissions may depend on whether a dynamic grant for msgA PUSCH (and even the preamble part) is provided or not. For ease of illustration, in some exemplary embodiments, the two-step RACH msgA preamble is also called preamble for short and the two-step RACH msgA PUSCH is also called PUSCH for short.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

In accordance with some exemplary embodiments, msgA PUSCH retransmission can be dynamically scheduled. According to an exemplary embodiment, a network node (e.g., a gNB) can request retransmission of msgA by providing a response to a UE in a higher layer message that may contain a grant for UL transmission (e.g., an UL grant) of a PUSCH. Optionally, the higher layer message may not indicate completion of the RA procedure. Because the RA procedure is incomplete, the UE may respond to the message by retransmitting the payload of msgA in a PUSCH (but excluding the PRACH preamble transmission) that can be transmitted according to the parameters in the UL grant. This higher layer message from the gNB can be considered to be an implicit retransmission request, since there may be no fields within the message that are limited to use in retransmission, in which case the message may be considered an implicit retransmission request. In the following, higher layer messages (such as RARs, msgB, a response to msgA, etc.) used for requesting or triggering retransmissions may be considered as retransmission requests whether or not they are implicit or explicit retransmission requests.

In accordance with some exemplary embodiments, the gNB can estimate, for example, how much incremental redundancy is "missing" for successful decoding, and then can request such incremental redundancy accordingly via a DL message or downlink control information (DCI), e.g., by including an indication of a RV. It may be noted that the RAR used for 3GPP NR Release 15 (or Rel-15 for short), such as RAR described in section 8.2 of 3GPP TS 38.213 V15.6.0, does not contain an indication of a RV to use for msg3. However, it may be beneficial for two-step RACH operation to indicate an RV in a response to msgA (e.g., a RAR message or msgB, and/or a physical layer (L1) signaling in DCI for a UE) for the retransmission of msgA PUSCH, so as to improve msgA transmission performance and reduce latency. On the other hand, it may be advantageous that the network can control the resources available or allocated for msgA retransmission and avoid the steady worst-case allocation, for example, by using the response to msgA to indicate resource configuration for the msgA (re) transmission dynamically. Application of some exemplary embodiments can provide more flexibility for scheduling the retransmission of msgA dynamically.

According to some exemplary embodiments, in order for a gNB to decode an msgA PUSCH transmission, the gNB may need to know which RV is used. A UE may initiate a first transmission of msgA by using a first predetermined RV, since the gNB may not provide an RV in a grant if the UE initiates the transmission. A retransmission of the msgA payload from the first transmission may use another RV that is indicated by the gNB in a retransmission request (such as in an msgB, a RAR or any other suitable response message to msgA), thereby enhancing the coding gain of the two combined received msgA transmissions.

In another embodiment, a second predetermined RV that is different from the first predetermined RV used for the first transmission of msgA may be used for one or more retransmissions of msgA. The second predetermined RV can be used when the UE transmits the msgA and receives a RAR from the gNB. Optionally, the second predetermined RV may be preconfigured, for example, being set to RV #0 (or another RV if RV #0 is used for the first transmission of msgA), or may be indicated by RRC signaling. In an exemplary embodiment, the second predetermined RV may not be carried in a RAR from the gNB. A benefit of this approach is that a Rel-15 RAR can be used to indicate retransmission of msgA, and so the UE can follow Rel-15 procedures, such as RAR reception procedure described in section 8.2 of 3GPP TS 38.213 V15.6.0, to receive and parse the RAR, as well as receive physical downlink control channel (PDCCH) using the Rel-15 random access-radio network temporary identifier (RA-RNTI), such as RA-RNTI described in 3GPP TS 38.321 V15.6.0. It may be possible to issue one or more other retransmission requests/commands for msgA if the first (and optionally second, etc.) retransmission is not successfully received by the gNB. Such further retransmissions may use a predetermined series of RVs (which may be different for every retransmission until all possible RVs are used after which the RV cycle may be repeated), specified or configured via signaling, e.g., in the system information.

According to some exemplary embodiments, the RV for each retransmission may also be indicated in the retransmission request/command, e.g., if the retransmission request/command comes in the form of a UL grant on the PDCCH indicating that the UL grant concerns a retransmission. One possibility may be for the UE to determine the RV to use for each retransmission according to the number of msgA retransmission the UE is instructed to make. In some cases, PDCCH reception may be not completely reliable, and so if a retransmission request/command is missed, the UE can select a different RV than the gNB intends. Therefore, in some embodiments where a first predetermined RV is used for the first transmission of msgA, a second predetermined RV may be used for one or more subsequent retransmissions of msgA. In this case, a four-step RAR can be used to signal a retransmission request/command to the UE and the predetermined RVs may be assigned to different transmissions of msgA.

In accordance with some exemplary embodiments, a first retransmission request from the gNB may come in the form of a RAR (e.g., an extended RAR with a RV indication, or a Rel-15 RAR with a RV for the retransmission being predetermined), while subsequent retransmission requests from the gNB may come in the form of UL grants in DCI messages on the PDCCH. In this case, the RAR may essentially trigger a fallback from a two-step RA procedure to a four-step RA procedure, so that the UE's retransmission can be seen as msg3 and, just like in the regular four-step RA procedure, the msg3 can be protected by hybrid automatic repeat request (HARQ).

According to an exemplary embodiment, more than one UE can transmit msgA in a given slot (possibly even in the same time/frequency resource(s) but separated by different PUSCH RU parameters, such as different DMRS ports or sequences), and thus more than one UE may require retransmission of msgA. In order to improve PUSCH resource efficiency, or in the case of a limited amount of PUSCH resource, it may be desirable for multiple UEs to retransmit msgA in the same PUSCH resources (e.g., the same resource elements and OFDM symbols). The gNB can separate PUSCH transmissions of multiple UEs in the same time/frequency resources by using multiple antenna reception with interference rejection combining (IRC). For example, the receiver of the gNB can form an antenna pattern with a main beam pointed toward one UE's PUSCH transmission and a null toward the other UE's PUSCH transmission. Optionally, the gNB may use other suitable reception techniques such as minimum mean square error-interference rejection combining (MMSE-IRC), or more advanced receivers using non-linear interference cancellation techniques such as successive interference cancellation or joint detection. Using these multi-antenna interference cancelation techniques then can enable multiple UEs which transmit msgA in a slot to retransmit msgA in the same PUSCH resource.

According to an exemplary embodiment where UEs perform PUSCH transmissions in the same time/frequency resource, measurements of the DMRS of each UE's PUSCH can be used to determine the IRC combining weights. This may require that each UE transmitting in the given PUSCH resource uses a distinct DMRS from the other UEs. For example, a distinct DMRS may be one that has a different DMRS port, a different DMRS sequence, or a different combination of DMRS port and DMRS sequence from the other DMRSs in the PUSCH resource.

It may be noted that the RAR used for 3GPP NR Rel-15 does not contain an indication of a DMRS to use for PUSCH carrying msg3. Therefore, Rel-15 does not support multiple UEs transmitting msg3 in the same radio resource. The lower spectral efficiency in Rel-15 is consistent with the small payloads (e.g., 56-bit or 72-bit) used for initial access in Rel-15, such as initial access described in 3GPP TS 38.213 V15.6.0. However, larger payloads may be considered for two-step RACH in Rel-16, leading to higher system loads. Therefore, greater spectral efficiency for two-step RACH retransmission can be beneficial.

In accordance with some exemplary embodiments, different UEs may retransmit msgA PUSCHs on the same time-frequency resource via forming different beams for different msgA PUSCHs with distinct DMRS configuration for each UE. This may bring higher spectral efficiency for msgA retransmission than for Rel-15 msg3 transmission, such as msg3 transmission described in section 8.3 of 3GPP TS 38.213 V15.6.0. In an exemplary embodiment, the retransmission requests may be signaled to the UEs by the gNB, for example, via one message with multiple retransmission requests for different UEs multiplexed.

According to an exemplary embodiment where multiple UEs may require msgA retransmissions, a single message containing multiple responses (e.g., RARs) may be used by the gNB to indicate to the multiple UEs that they can retransmit the msgA PUSCH payloads in a new transmission. In such cases, the gNB can determine which UE(s) may need to perform retransmission, and use some identifier(s) to indicate the determined UE(s). Considering that a preamble used for msgA transmission may be associated with the msgA PUSCH, in some exemplary embodiments, an index/identifier of the msgA preamble can be used as the identifier for msgA retransmission.

According to an exemplary embodiment, a gNB may transmit a message containing one or more responses such as RARs to UEs which transmit msgA to the gNB. The gNB may include a response in the message that is intended for a UE. Optionally, the response intended for the UE may be a response which includes a RA preamble identifier that is the same as one the UE used to transmit a preamble in its msgA transmission. The response may contain a DMRS identifier that the UE is instructed to use in a PUSCH transmission in response to the message. Correspondingly, the UE may receive the message containing one or more responses from the gNB. The UE can select a response in the message that is intended for the UE, for example, a response which includes a RA preamble identifier that is the same as the one the UE used to transmit a preamble in its msgA transmission. The selected response may contain a DMRS identifier. Then the UE can transmit a PUSCH and an associated DMRS, for example, transmitting the DMRS according to the DMRS identifier. The transmission according to the DMRS identifier may comprise transmitting a DMRS port indicated by the DMRS identifier, a DMRS sequence indicated by the DMRS identifier, or a combination of a DMRS port and a DMRS sequence initialization indicated by the DMRS identifier. The gNB may receive this PUSCH transmission from the UE.

In accordance with some exemplary embodiments, a gNB may receive a msgA preamble from a UE but fail to properly decode msgA PUSCH. In this case, the gNB can use HARQ mechanisms via the PDCCH to request retransmission of msgA PUSCH. With HARQ applied to msgA PUSCH, the gNB may need to address PDCCH/DCI transmissions to the UE. To enable this, a RNTI may be associated with each preamble that can be used for two-step RA in the cell. As an example, this RNTI may be denoted RB-RNTI. Optionally, if the preambles available for two-step RA are divided into subsets for different SSB/beam directions, the RB-RNTIs may be divided into similar subsets.

In the case that the gNB successfully receives the msgA preamble but fails to properly decode msgA PUSCH from the UE, the gNB can transmit an UL grant on the PDCCH addressed to the RB-RNTI mapping to the received preamble, for example, with HARQ-ID=0 and the new data indicator (NDI) indicating retransmission (which assumedly means that NDI=0). As such, the gNB can use a DCI message to schedule PUSCH transmission of the UE. According to an exemplary embodiment, the RV field may be explicitly set. Optionally, the RV sequence (e.g., the order in which different RVs are (re)transmitted) may be configured in the system information or determined according to pre-configuration information.

In accordance with some exemplary embodiments, transmit power ramping autonomously performed by the UE may not be needed, since the transmit power can be explicitly indicated by the transmit power command (TPC) in the UL grant. However, in contrast to the TPC field in the UL grant in a RAR, which may contain 3 bits, the TPC field in the UL grant in a DCI message scheduling PUSCH transmission may contain only 2 bits. Hence, the interpretation of these 2 bits may (optionally) be modified when used for scheduling retransmission of msgA PUSCH, in order to allow indication of a wider (but coarser) range of transmit power changes (at least for the first retransmission, after which normal transmit power changes may probably suffice).

Optionally, the DCI message containing the UL grant can be extended (or a new DCI format may be designed) to contain a timing advance (TA) indication/command. It can be realized that the HARQ retransmission procedure may proceed according to normal rules. In the case that the gNB decodes the msgA PUSCH based on one or more retransmissions of different RVs of the msgA PUSCH from the UE, the gNB can transmit msgB to the UE.

In accordance with some exemplary embodiments, a UE in RRC_CONNECTED state can include its C-RNTI (e.g., on the MAC layer, and optionally in a C-RNTI MAC control element (CE)) in the initial transmission of msgA PUSCH, and this C-RNTI may also be included in latter retransmissions of the msgA PUSCH.

In accordance with some exemplary embodiments, a first RNTI may be used for the initial transmission of msgA PUSCH (e.g., the first RNTI may be included in the msgA PUSCH), while a second RNTI may be used for the retransmission of msgA PUSCH (e.g., the second RNTI may be included in the retransmitted msgA PUSCH). Optionally, the first RNTI and the second RNTI may be different or the same in the case that soft/chase combining is not supported between transmission and retransmission. Alternatively or additionally, the first RNTI and the second RNTI may be the same in the case that soft/chase combining is supported between different transmissions. In some cases, even if soft/chase combining is supported, the first and second RNTIs may be different, as a descrambling can be done before soft combining.

In accordance with some exemplary embodiments, the msgA RNTI (e.g., the RNTI used for the msgA PUSCH data scrambling sequence generation) or some other RNTIs can be included in a message (e.g., a RAR message, a DCI message, etc.) in response to the msgA transmission to indicate the retransmission of msgA PUSCH. According to an exemplary embodiment, a temporary C-RNTI (TC-RNTI) may be included in the response message to the msgA transmission. In this case, the response message from the gNB may be a fallback RAR message for the normal fallback indication so that the UE can continue with the normal msg3 transmission.

In accordance with some exemplary embodiments, msgA PUSCH retransmission may be performed without dynamic grant. According to an exemplary embodiment, resource allocation for retransmissions of msgA may be predetermined, and thus the resources can be used for msgA PUSCH transmissions without dynamic allocation. Optionally, the resource allocation can be configured according to a predetermined series, or sequence, of "regular" POs/PUSCH RUs, typically combined with their respective associated PRACH occasions. Here, the term "regular" implies that the POs/PUSCH RUs (and PRACH occasions) may be used also for initial msgA transmission.

In the absence of a response to the initial msgA, a UE can retransmit msgA using the next PRACH/PUSCH occasion in the predetermined series or sequence. Another possibility is that a gNB can confirm reception of the msgA preamble, but not msgA PUSCH, and does not explicitly allocate resources for retransmission(s). In this case, the UE can use the predetermined PO(s)/PUSCH RU(s) for the retransmission(s) of msgA PUSCH. In an embodiment, the UE may only transmit msgA PUSCH in the msgA retransmission. In another embodiment, the UE may retransmit both msgA preamble and msgA PUSCH.

In the case that the utilized radio resources are regular PRACH/PUSCH occasions/PUSCH RUs which may be used for initial msgA transmission or retransmissions of msgA, the gNB may need to determine whether the received msgA is corresponding to an initial transmission or a retransmission. Furthermore, if the received msgA is corresponding to a retransmission, the gNB may need to know which retransmission number (e.g., a first retransmission, a second retransmission, etc.) the received msgA corresponds to. Optionally, the gNB may need to be able to associate the retransmission of msgA with the initial transmission and possible earlier retransmissions of msgA, in order to enable soft-combining of different transmissions of msgA.

In accordance with some exemplary embodiments, the PO/PUSCH RU to use for the retransmission of msgA may be predetermined based on the preceding (re)transmission of msgA. As an example, the initial transmission and retransmission(s) of msgA may use a series of POs/PUSCH RUs, e.g., a series of consecutive occurrences of the same PO/PUSCH RU (as described with respect to FIGS. 3A-3B). To complement this, a certain transmission property may be used to indicate the (re)transmission number. To this end, the transmission property may be varied/changed for each transmission according to a predetermined sequence (e.g., the predetermined sequence may be configured via the system information or dedicated signaling or may be preconfigured).

According to an embodiment, the predetermined sequence may depend on the PO/PUSCH RU, out of multiple POs/PUSCH RUs associated with the same PRACH occasion, which is used for the initial msgA transmission. In another embodiment, the predetermined sequence may depend on the PO/PUSCH RU, out of a series of POs/PUSCH RUs, which is used for the initial msgA transmission. As one example of this, the mapping of transmission property-to-(re)transmission number may be defined/configured for each PO/PUSCH RU in a series of PO/PUSCH RUs.

According to another embodiment, the predetermined sequence may be the same irrespective of PO/PUSCH RU used for the initial transmission (e.g., a certain transmission property may always indicate the same (re)transmission number). There may be many variants of this embodiment. For instance, different groups of preambles may be used to indicate the (re)transmission number (e.g., a certain preamble group may indicate a certain (re)transmission number). In this case, the preambles a UE uses for a series of retransmissions can be determined by the preamble selected for the initial transmission.

In accordance with some exemplary embodiments, the scrambling of msgA PUSCH transmission may be used as a transmission property which may be associated with the initial transmission and subsequent retransmissions of msgA PUSCH (according to a predetermined sequence). The scrambling of msgA PUSCH transmission may be used to indicate the (re)transmission number, for example, a first transmission, a first retransmission (i.e. a second transmission), a second retransmission (i.e. a third transmission), etc. To this end, a certain scrambling sequence (e.g., S1) may indicate "first msgA transmission (i.e., initial msgA transmission)" while another scrambling (e.g., S2) may indicate "first msgA PUSCH retransmission (i.e., second msgA PUSCH transmission)", etc. Hence, irrespective of in which PO/PUSCH RU in a series of POs/PUSCH RUs the gNB receives a msgA PUSCH transmission, if the scrambling of the msgA PUSCH transmission is S1, this means that it is the initial msgA transmission. Similarly, irrespective of in which PO/PUSCH RU in a series of POs/PUSCH RUs the gNB receives the msgA PUSCH transmission, if the scrambling of the msgA PUSCH transmission is S2, this means that it is a first retransmission of msgA PUSCH and the gNB can infer the PO/PUSCH RU in which the first msgA transmission is sent and can thus soft-combine the two msgA PUSCH transmissions.

In accordance with some exemplary embodiments, the scrambling of msgA PUSCH transmission (also called the msgA PUSCH scrambling) may indicate a RV which is associated with the scrambling and (re)transmission number indicated by the scrambling. The association between RV and scrambling/(re)transmission number can be configured via RRC signaling (e.g., in the system information or using dedicated signaling) or it may be preconfigured. Similarly, the predetermined sequence of scrambling sequences (and its association with (re)transmission numbers/RV) may be configured via RRC signaling (e.g., in the system information or using dedicated signaling) or it may be preconfigured.

In the case that the msgA PUSCH scrambling is used to indicate the (re)transmission number (and optionally RV), other transmission properties, including the series of PO used for the (re)transmissions, may remain the same between consecutive msgA PUSCH (re)transmissions. According to some exemplary embodiments, a combination of transmission properties (e.g., the scrambling and the DMRS sequence, etc.) may be used to indicate the (re)transmission number, and optionally the RV.

In accordance with some exemplary embodiments, the transmission property parameter may vary in a predetermined sequence. As an example, a transmission property parameter value (such as the scrambling or the DMRS sequence of port configuration) may be associated with each PO or PUSCH RU (or PRACH occasion) in a series of POs/PUSCH RUs. Optionally, the transmission property parameter values may be allocated in a cyclic fashion, e.g., the same transmission property parameter value may recur for a PO/PUSCH RU (or PRACH occasion) in the series of POs/PUSCH RUs when the property parameter value space is depleted. A transmission property parameter value may not return as associated with a PO/PUSCH RU until the maximum number of retransmission possibilities/occasions since the last PUSCH occasion (or PRACH occasion) associated with the same transmission property parameter have elapsed. That is, the maximum number of transmissions (including the initial transmission and all retransmissions) may not exceed the number of values of the concerned transmission property parameter. The concerned transmission property parameter may remain constant during all (re)transmissions and its value hence can indicate the PO/PUSCH RU (or PRACH occasion) in which the initial transmission of msgA is performed, thus allowing the gNB to derive the (re)transmission number, the number of (re)transmissions to soft-combine as well as the RV (if the RV is predefined per retransmission).

Alternatively or additionally, the transmission property parameter used as an indicator of the (re)transmission number may have a different value associated with each consecutive PO/PUSH RU in a series of POs/PUSCH RUs. A UE can transmit its initial msgA PUSCH transmission and use the transmission property parameter value associated with the PO/PUSCH RU used for the transmission. Then the UE, in absence of acknowledgement, may retransmit msgA PUSCH (with different RVs, e.g., according to a predetermined or configured order) in subsequent POs/PUSCH RUs in the same series of POs/PUSCH RUs, and use the same transmission property parameter value as in the initial msgA PUSCH transmission. Hence, if the gNB receives, for example a third retransmission, it can deduce from the indicating transmission property parameter value which PO/PUSCH RU the UE uses for the initial msgA PUSCH transmission. This thus may allow the gNB to soft-combine any fractions of receptions from the initial transmission and all preceding retransmissions of msgA PUSCH.

Optionally, the transmission property parameter used as the indicator of the (re)transmission number may have its values associated with PRACH occasions instead of POs/PUSCH RUs. In this variant, the transmission property parameter value associated with a PRACH occasion can be applied to all POs/PUSCH RUs associated with that PRACH occasion.

In accordance with some exemplary embodiments, a combination of msgA PUSCH transmission properties may be used to indicate the PO/PUSCH RU (or PRACH occasion) associated with the initial transmission in a sequence of msgA PUSCH (re)transmissions. For example, a certain combination of the scrambling and DMRS sequence may be associated with a certain PO/PUSCH RU (or PRACH occasion).

In accordance with some exemplary embodiments, whether msgA PUSCH retransmission resource can be reserved may be configurable in RRC signaling. For example, the retransmission resource reservation may be only enabled in cells where statistics show that preamble collisions are unusually common and when the load in the cell is low.

In accordance with some exemplary embodiments, in the case that no dynamic grant is scheduled for the retransmission of msgA PUSCH, if no HARQ is provided to a UE from a gNB, the UE may keep retransmitting (i.e., assuming negative acknowledgement (NACK)), until it receives the DL scheduling allocation for a contention resolution message.

Figure 4A:
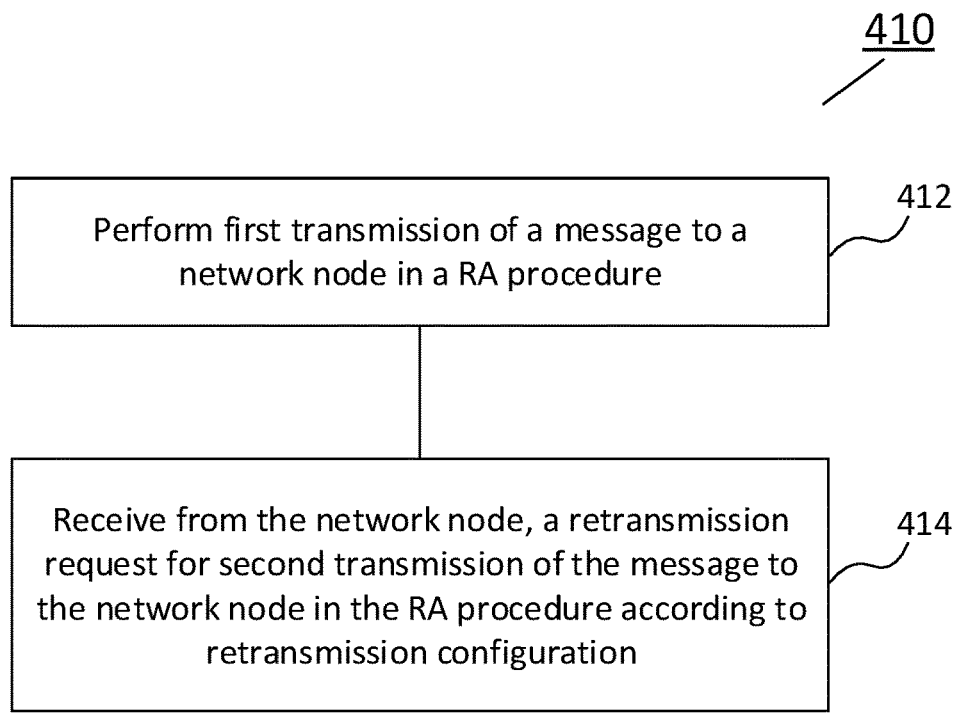
FIG. 4A is a flowchart illustrating a method according to some embodiments of the present disclosure.

FIG. 4A is a flowchart illustrating a method 410 according to some embodiments of the present disclosure. The method 410 illustrated in FIG. 4A may be performed by a terminal device or an apparatus communicatively coupled to the terminal device. In accordance with an exemplary embodiment, the terminal device such as a UE may be configurable to connect to a network node such as a gNB, for example, by performing a RA procedure (e.g., a two-step RA procedure).

According to the exemplary method 410 illustrated in FIG. 4A, the terminal device can perform first transmission of a message to a network node in a RA procedure, as shown in block 412. The first transmission of the message (e.g., msgA) may comprise transmission of a first preamble and transmission of a shared channel. In an exemplary embodiment, the shared channel may comprise a PUSCH. As shown in block 414, the terminal device may receive from the network node, a retransmission request for second transmission of the message to the network node in the RA procedure according to retransmission configuration. In an exemplary embodiment, the retransmission request (e.g., a RAR message, a DCI message, and/or any other suitable message in response to msgA) may be received on at least one of a downlink shared channel (e.g., a physical downlink shared channel (PDSCH), etc.) and a downlink control channel (e.g., PDCCH, etc.).

In accordance with some exemplary embodiments, the retransmission configuration may comprise resource configuration indicated by at least one of:
  predetermined configuration information for the terminal device;
  RRC signaling for the terminal device; and
  the retransmission request.

In accordance with some exemplary embodiments, the retransmission configuration may indicate at least one of:
  a RV;
  a preamble identifier;
  a RA channel time-frequency resource (e.g., a location in time domain and/or frequency domain available for a preamble or msgA PRACH);
  a shared channel time-frequency resource (e.g., a location in time domain and/or frequency domain available for a UL shared channel or msgA PUSCH);
  a DMRS identifier (e.g., an index assigned to a PUSCH RU to identify at least one of a DMRS antenna port and a DMRS sequence initialization);
  an MCS (e.g., modulation state and/or coding rate); and
  transmission power (e.g., power ramping for msgA PRACH and/or msgA PUSCH).

Optionally, the retransmission configuration may be different from configuration for the first transmission of the message. For example, different radio resources (e.g., RVs, DMRS sequences, etc.) may be used for the first transmission and the retransmission of the message.

In accordance with some exemplary embodiments, the retransmission request may be one of one or more responses included in a response message from the network node. The one or more responses may be intended for one or more terminal devices, respectively. Optionally, the retransmission request may comprise an identifier of the first preamble. As such, the terminal device can select the retransmission request intended for the terminal device (which is also the response by the network node to the message transmitted by the terminal device) from the response message transmitted by the network node. Similarly, other responses included in the response message from the network node may also comprise the corresponding preamble identifiers associated with the other terminal devices, so that the other responses can be selected from the response message by the associated terminal devices.

In accordance with some exemplary embodiments, the retransmission request may comprise information about a RNTI to indicate retransmission of the shared channel (e.g., PUSCH). Optionally, the RNTI may be based at least in part on RRC status of the terminal device. For example, depending on whether the terminal device is in RRC-CONNECTED status or not, the retransmission request may comprise C-RNTI or RB-RNTI (or other suitable RNTI) to instruct the terminal device to retransmit at least part of the message such as msgA. According to an exemplary embodiment, the RNTI related information may indicate whether the same RNTI can be used for the first and second transmissions of the message such as msgA.

In accordance with some exemplary embodiments, the terminal device can perform the second transmission of the message to the network node in response to the retransmission request. Optionally, the second transmission of the message may comprise at least retransmission of the shared channel. For example, the second transmission of the message may comprise transmission of a second preamble (e.g., msgA preamble) and retransmission of the shared channel (e.g., msgA PUSCH). Alternatively, the second transmission of the message may comprise retransmission of the shared channel (e.g., msgA PUSCH), for example, if the first preamble from the terminal device can be detected by the network node.

Figure 4B:
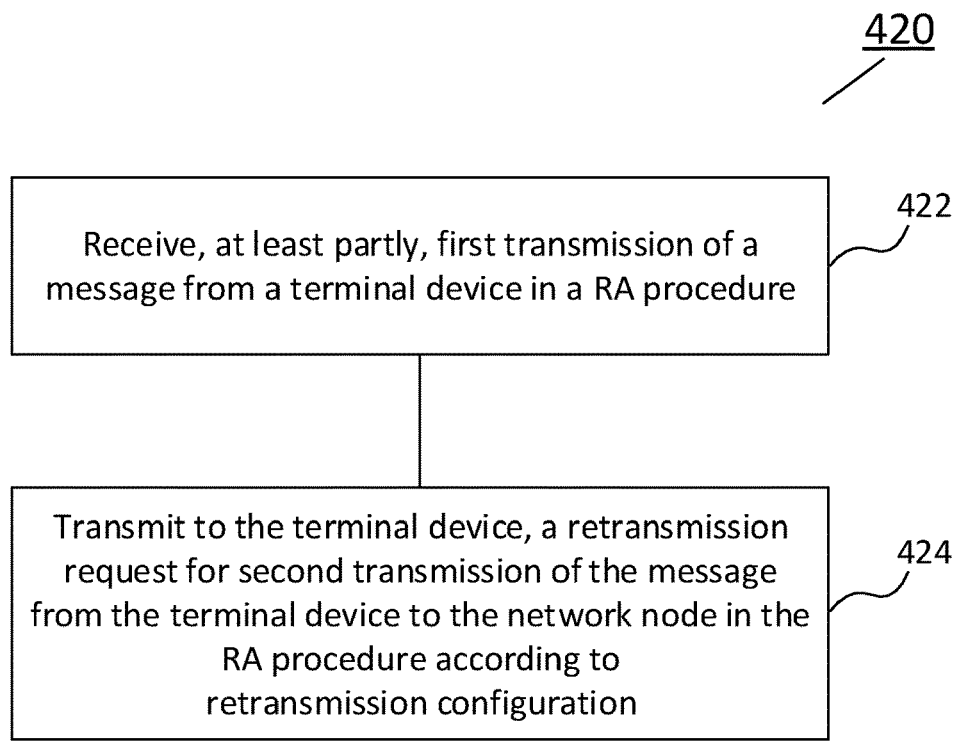
FIG. 4B is a flowchart illustrating another method according to some embodiments of the present disclosure.

FIG. 4B is a flowchart illustrating a method 420 according to some embodiments of the present disclosure. The method 420 illustrated in FIG. 4B may be performed by a network node or an apparatus communicatively coupled to the network node. In accordance with an exemplary embodiment, the network node may comprise a base station such as a gNB. The network node may be configurable to communicate with one or more terminal devices such as UEs which can connect to the network node by performing a RA procedure (e.g., a two-step RA procedure).

According to the exemplary method 420 illustrated in FIG. 4B, the network node can receive, at least partly, first transmission of a message from a terminal device (e.g., the terminal device as described with respect to FIG. 4A) in a RA procedure, as shown in block 422. The first transmission of the message may comprise transmission of a first preamble and transmission of a shared channel. As described with respect to FIG. 4A, the message transmitted from the terminal device to the network node may comprise msgA in a two-step RA procedure. It can be realized that the message may also be any suitable message in other types of RA procedure where the terminal device can access the network node according to the proposed solution.

In accordance with some exemplary embodiments, the network node can transmit to the terminal device, a retransmission request for second transmission of the message from the terminal device to the network node in the RA procedure according to retransmission configuration, as shown in block 424. In an exemplary embodiment, the retransmission request may be transmitted on at least one of a downlink shared channel (e.g., PDCCH, etc.) and a downlink control channel (e.g., PDCCH, etc.).

In accordance with some exemplary embodiments, the network node can receive the second transmission of the message from the terminal device in response to the retransmission request. Optionally, the network node may combine the first transmission and the second transmission of the message received from the terminal device, so as to improve the transmission performance of the message such as msgA. In order to perform soft-combining of different transmissions of msgA, the network node may be capable of distinguishing the first transmission and subsequent transmissions of msgA, for example, according to different transmission configurations (e.g., RVs, RNTIs, preamble identifiers, etc.) for msgA.

It can be appreciated that the steps, operations and related configurations of the method 420 illustrated in FIG. 4B may be correspond to the steps, operations and related configurations of the method 410 illustrated in FIG. 4A. For example, the retransmission configuration and the retransmission request as described with respect to FIG. 4B may correspond to the retransmission configuration and the retransmission request as described with respect to FIG. 4A, respectively.

Figure 4C:
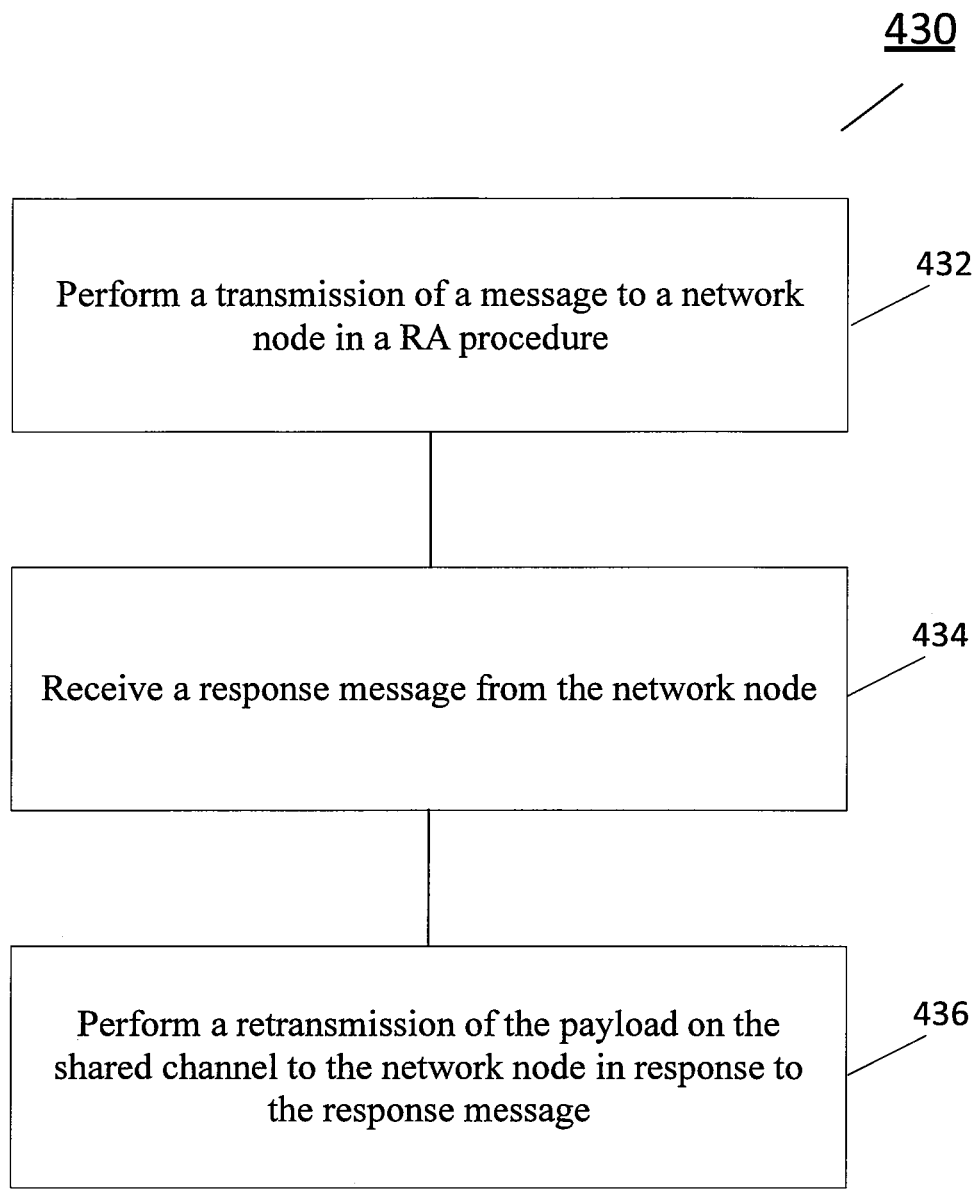
FIG. 4C is a flowchart illustrating another method according to some embodiments of the present disclosure.

FIG. 4C is a flowchart illustrating a method 430 according to some embodiments of the present disclosure. The method 430 illustrated in FIG. 4C may be performed by a terminal device or an apparatus communicatively coupled to the terminal device. In accordance with an exemplary embodiment, the terminal device such as a UE may be configurable to connect to a network node such as a gNB, for example, by performing a RA procedure (e.g., a two-step RA procedure).

According to the exemplary method 430 illustrated in FIG. 4C, the terminal device may perform a transmission of a message to a network node in a RA procedure, as shown in block 432. The transmission of the message (e.g., msgA) may comprise transmission of a preamble and transmission of a payload on a shared channel. In an exemplary embodiment, the shared channel may comprise a PUSCH. As shown in block 434, the terminal device may receive a response message from the network node. In response to the response message, as shown in block 436, the terminal device may perform a retransmission of the payload on the shared channel to the network node, e.g. according to retransmission configuration.

In an exemplary embodiment, the response message (e.g., a RAR message and/or any other suitable message in response to msgA) may be received on a downlink shared channel (e.g., PDSCH, etc.).

In accordance with some exemplary embodiments, the retransmission configuration may comprise resource configuration indicated by at least one of: predetermined configuration information for the terminal device, and the response message.

In accordance with some exemplary embodiments, the retransmission configuration may be different from configuration for the transmission of the message.

In accordance with some exemplary embodiments, the retransmission configuration may indicate at least one of: a RV, a preamble identifier, and a shared channel time-frequency resource.

In accordance with some exemplary embodiments, the response message may include one or more responses.

In accordance with some exemplary embodiments, the one or more responses may be intended for one or more terminal devices, respectively.

In accordance with some exemplary embodiments, the response message may comprise an identifier of the preamble.

In accordance with some exemplary embodiments, the response message may comprise information about a RNTI to indicate the retransmission of the payload on the shared channel.

In accordance with some exemplary embodiments, the response message may comprise a fallback RAR.

Figure 4D:
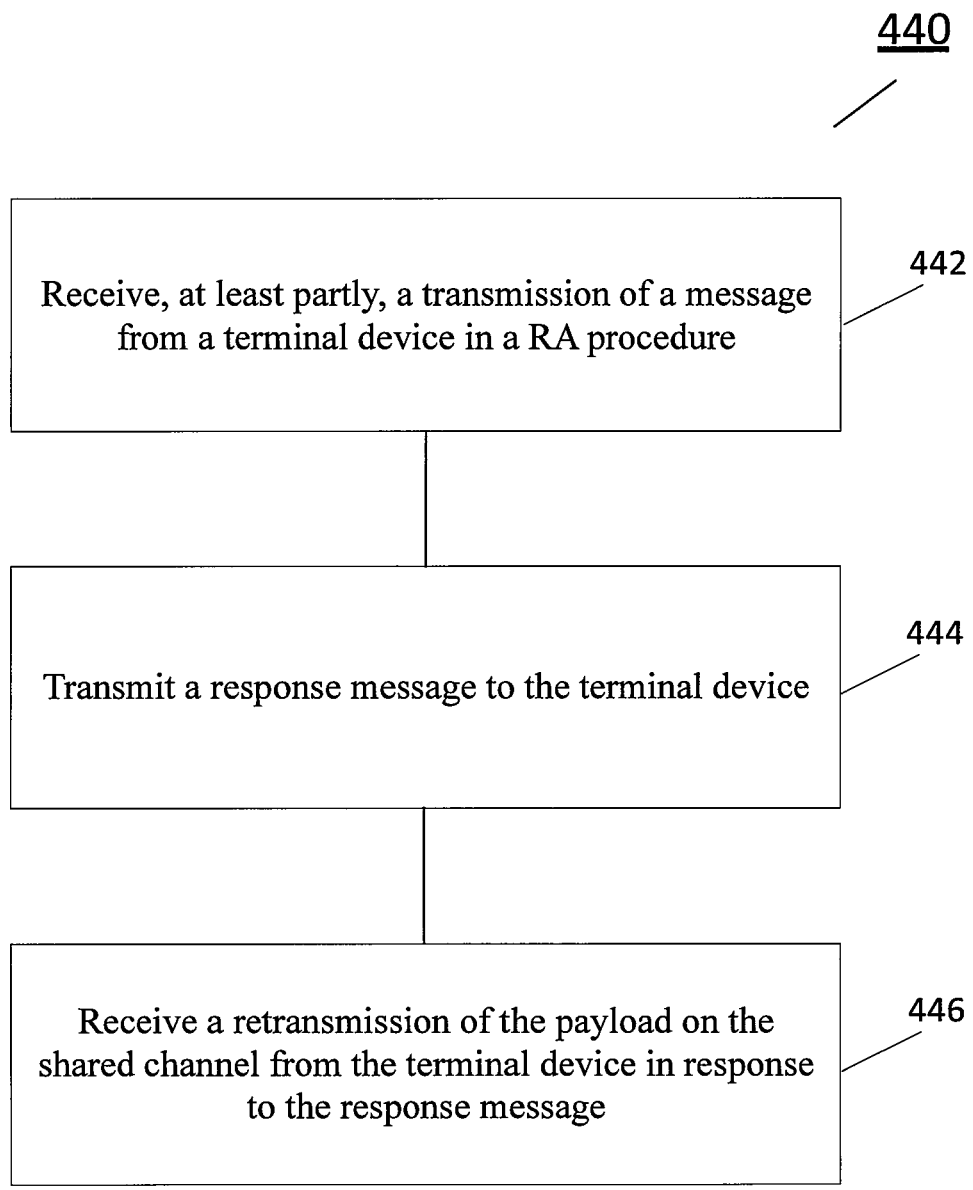
FIG. 4D is a flowchart illustrating another method according to some embodiments of the present disclosure.

FIG. 4D is a flowchart illustrating a method 440 according to some embodiments of the present disclosure. The method 440 illustrated in FIG. 4D may be performed by a network node or an apparatus communicatively coupled to the network node. In accordance with an exemplary embodiment, the network node may comprise a base station such as a gNB. The network node may be configurable to communicate with one or more terminal devices such as UEs which can connect to the network node by performing a RA procedure (e.g., a two-step RA procedure).

According to the exemplary method 440 illustrated in FIG. 4D, the network node may receive, at least partly, a transmission of a message from a terminal device (e.g., the terminal device as described with respect to FIG. 4C) in a RA procedure, as shown in block 442. The transmission of the message may comprise transmission of a preamble and transmission of a payload on a shared channel (e.g. PUSCH, etc.). As described with respect to FIG. 4C, the message transmitted from the terminal device to the network node may comprise msgA in a two-step RA procedure. It can be realized that the message may also be any suitable message in other types of RA procedure where the terminal device can access the network node according to the proposed solution.

In accordance with some exemplary embodiments, the network node may transmit a response message to the terminal device, as shown in block 444. In an exemplary embodiment, the response message may be transmitted on a downlink shared channel (e.g., PDSCH, etc.). According to the exemplary method 440 illustrated in FIG. 4D, the network node may receive a retransmission of the payload on the shared channel from the terminal device in response to the response message, as shown in block 446. The retransmission may be according to retransmission configuration.

It can be appreciated that the steps, operations and related configurations of the method 440 illustrated in FIG. 4D may be correspond to the steps, operations and related configurations of the method 430 illustrated in FIG. 4C. For example, the response message and the retransmission configuration as described with respect to FIG. 4D may correspond to the response message and the retransmission configuration as described with respect to FIG. 4C, respectively.

Figure 5A:
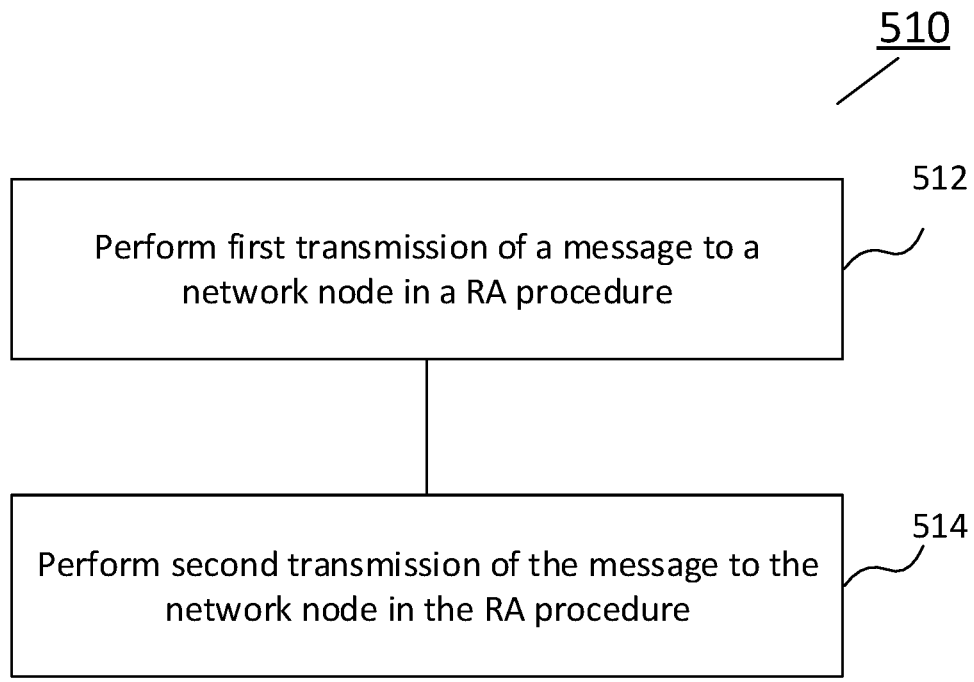
FIG. 5A is a flowchart illustrating yet another method according to some embodiments of the present disclosure.

FIG. 5A is a flowchart illustrating a method 510 according to some embodiments of the present disclosure. The method 510 illustrated in FIG. 5A may be performed by a terminal device or an apparatus communicatively coupled to the terminal device. In accordance with an exemplary embodiment, the terminal device such as a UE may be configurable to connect to a network node such as a gNB, for example, by performing a RA procedure (e.g., a two-step RA procedure).

According to the exemplary method 510 illustrated in FIG. 5A, the terminal device can perform first transmission of a message to a network node in a RA procedure, as shown in block 512. The first transmission of the message may comprise transmission of a first preamble and transmission of a shared channel. In accordance with some exemplary embodiments, the terminal device can perform second transmission of the message to the network node in the RA procedure, as shown in block 514. The second transmission of the message may comprise at least retransmission of the shared channel. The first transmission and the second transmission of the message may be associated with a first transmission property and a second transmission property, respectively. According to some exemplary embodiments, the message transmitted from the terminal device to the network node may comprise msgA. Correspondingly, the shared channel may comprise a PUSCH. It can be realized that the terminal device can perform the method 510 without receiving from the network node a response to the message such as msgA.

In accordance with some exemplary embodiments, the first transmission property and the second transmission property may be related to scrambling of shared channel transmission, a DMRS sequence, or a combination thereof. For example, the first transmission property may comprise first scrambling and/or a first DMRS sequence. Similarly, the second transmission property may comprise second scrambling and/or a second DMRS sequence. It can be appreciated that the first transmission property and the second transmission property may be related to any other suitable transmission property or parameter. Optionally, the second transmission property may be based at least in part on the first transmission property. For example, the first transmission property and the second transmission property can be determined according to a specific rule.

In accordance with some exemplary embodiments, the association between the first transmission of the message and the first transmission property, and the association between the second transmission of the message and the second transmission property may be indicated by at least one of: system information, RRC signaling for the terminal device, and pre-configuration information for the terminal device. As such, different transmissions of the message can be distinguished according to the associated transmission properties.

In accordance with some exemplary embodiments, the first transmission property and the second transmission property may be associated with resource configurations (e.g., RVs, ROs, POs, PUSCH RUs, etc.) for the first transmission and the second transmission of the message, respectively. In this case, the network node can determine the associated resources allocated to different transmissions of the message, based at least in part on the first transmission property and/or the second transmission property.

Figure 5B:
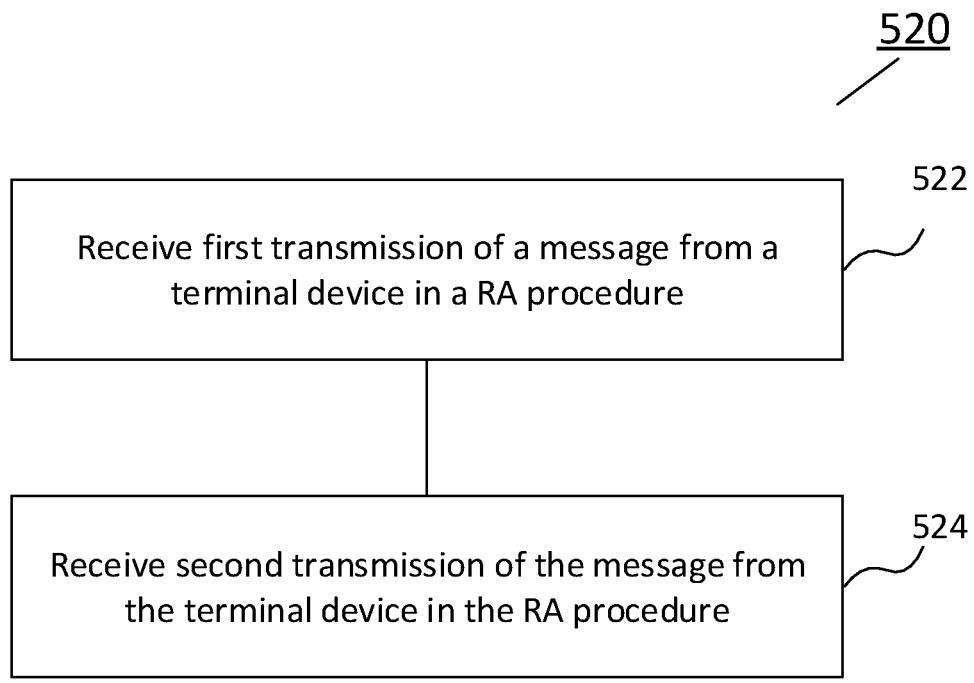
FIG. 5B is a flowchart illustrating a further method according to some embodiments of the present disclosure.

FIG. 5B is a flowchart illustrating a method 520 according to some embodiments of the present disclosure. The method 520 illustrated in FIG. 5B may be performed by a network node or an apparatus communicatively coupled to the network node. In accordance with an exemplary embodiment, the network node may comprise a base station such as a gNB. The network node may be configurable to communicate with one or more terminal devices such as UEs which can connect to the network node by performing a RA procedure (e.g., a two-step RA procedure).

According to the exemplary method 520 illustrated in FIG. 5B, the network node can receive first transmission of a message (e.g., msgA, etc.) from a terminal device (e.g., the terminal device as described with respect to FIG. 5A) in a RA procedure, as shown in block 522. The first transmission of the message may comprise transmission of a first preamble and transmission of a shared channel. In accordance with some exemplary embodiments, the network node can receive second transmission of the message from the terminal device in the RA procedure, as shown in block 524. The second transmission of the message may comprise at least retransmission of the shared channel (e.g., PUSCH, etc.). The first transmission and the second transmission of the message may be associated with a first transmission property and a second transmission property, respectively. Optionally, the network node may combine the reception of the first transmission and the reception of the second transmission, based at least in part on the first transmission property and the second transmission property.

It can be appreciated that the steps, operations and related configurations of the method 520 illustrated in FIG. 5B may be correspond to the steps, operations and related configurations of the method 510 illustrated in FIG. 5A. For example, the first transmission property, the second transmission property and the association between thereof as described with respect to FIG. 5B may correspond to the first transmission property, the second transmission property and the association between thereof as described with respect to FIG. 5A, respectively.

It can be appreciated that some exemplary embodiments of the present disclosure may be implemented in combination. For example, the terminal device as described with respect to FIG. 4A or FIG. 4C may also be configured to perform the method 510 as illustrated in FIG. 5A. In this case, the terminal device can determine, depending implementations, whether to perform retransmission of msgA according to the retransmission request or the response message from the network node, or by utilizing the association between transmission properties and different transmissions of msgA. Similarly, the network node as described with respect to FIG. 4B or FIG. 4D may also be configured to perform the method 520 as illustrated in FIG. 5B. In this case, the network node can determine, depending implementations, whether to use the configuration by the retransmission request or the response message from the network node, or the association between transmission properties and different transmissions of msgA, to receive the retransmission of msgA.

The proposed solution according to one or more exemplary embodiments can enable a terminal device to perform (re)transmission of a RA message (e.g., msgA in a two-step RA procedure) to a network node, for example, depending on whether the msgA retransmission is dynamically scheduled by the network node or not. In accordance with some exemplary embodiments, the terminal device can retransmit at least a part of msgA, according to radio configuration by the network node in a response message to msgA. Alternatively or additionally, the terminal device can perform the msgA retransmission without dynamic grant from the network node. Optionally, different transmissions of msgA can be indicated by the associated transmission properties. Some exemplary embodiments can also enable the network node to implement soft/chase combining of different transmissions (e.g., including both initial transmission and retransmissions) of msgA. Application of some exemplary embodiments can improve flexibility of resource configuration, enhance performance of a RA procedure, and reduce transmission latency.

In accordance with an exemplary embodiment, a UE can retransmit a preamble and PUSCH in a RA procedure, and the preamble may be associated with retransmission as well as PUSCH resources. For example, the UE can transmit a first RA preamble in a first transmission to a gNB, the first preamble being associated with a first time/frequency location of an uplink physical channel (such as PRACH), and transmit a physical channel (such as PUSCH) in the time/frequency location in a second transmission to the gNB, the physical channel conveying an instance of information bits. Then the UE can transmit a second RA preamble in a third transmission to the gNB, the second preamble being associated with a second time/frequency location of an uplink physical channel and with a retransmission of the physical channel. The UE can transmit the physical channel in the time/frequency location in a fourth transmission to the gNB, the physical channel conveying the instance of information bits.

In accordance with an exemplary embodiment, retransmission resources can be configured by a response to the initial or the previous transmissions. For example, the retransmission resources can be signaled by a response message (e.g., a RAR or a DCI message) to the previous transmission or to the initial transmission. Alternatively or additionally, the retransmission resources may be signaled by L1 signaling in DCI scheduling the retransmission of the fourth transmission.

In accordance with an exemplary embodiment, an initial msgA PUSCH transmission may use a first RV, while an msgA PUSCH retransmission may use a different RV. For example, a UE can transmit a first RA preamble in a first transmission to a gNB, the first preamble being associated with a first time/frequency location of an uplink physical channel (such as PRACH), and transmit a physical channel (such as PUSCH) in the time/frequency location in a second transmission to the gNB. The physical channel may convey an instance of information bits, and the information bits can be forward error correction coded according to a first RV. Then the UE can transmit a physical channel conveying the instance of information bits to the gNB, and the information bits can be forward error correction coded according to a second RV.

In accordance with an exemplary embodiment, the first RV may be RV0 and the second RV may be a constant value preconfigured for the UE. Optionally, the UE may receive a higher layer message (e.g. a RAR) from the gNB, identifying the second RV and radio resources in which to transmit the physical channel conveying the instance of information bits that are forward error correction coded according to the second RV. Alternatively or additionally, the UE may receive a DCI message from the gNB, identifying the second RV and radio resources in which to transmit the physical channel conveying the instance of information bits that are forward error correction coded according to the second RV.

In accordance with an exemplary embodiment, retransmissions of msgA granted by a RAR may use MU-MIMO via DMRS ports and/or sequences. For example, a UE can transmit a first RA preamble in a first transmission to a gNB, the first preamble being associated with a first time/frequency location of an uplink physical channel (such as PRACH), and transmit a physical channel (such as PUSCH) in the time/frequency location in a second transmission to the gNB, the physical channel conveying an instance of information bits. Then the UE can receive a response message containing one or more RARs from the gNB, and select a RAR in the response message that includes a RA preamble identifier that identifies the first preamble. Optionally, the UE can transmit the physical channel and a reference signal according to the selected RAR. The reference signal may be transmitted according to parameters contained in the selected RAR, the parameters identifying one or more of a reference signal port and a reference signal scrambling initialization.

In accordance with an exemplary embodiment, retransmissions of msgA granted by a RAR may use the same RNTI or different RNTIs related to different RRC status of a UE. For example, a UE can retransmit a RA message scheduled by a response message from a gNB, and the retransmitted RA message may use the same RNTI or a different RNTI from the initial transmission of the RA message, depending on the RRC status of the UE. Optionally, the RNTI used for the msgA PUSCH data scrambling sequence generation or some other RNTIs than TC-RNTI can be included in a response message to the msgA transmission to indicate a retransmission of msgA PUSCH.

In accordance with an exemplary embodiment, the radio resources for the retransmission of msgA PUSCH can be determined according to a previous transmission and/or retransmission of msgA of a UE. For example, the (re)transmission number can be indicated by a transmission property (e.g., the scrambling, a DMRS sequence, etc.) associated with the (re)transmission number. Optionally, the transmission property such as the scrambling may be associated with each PO or PUSCH RU, and the UE can use the transmission property associated with the PO/PUSCH RU used for the initial msgA PUSCH transmission for all retransmissions (if any).

The various blocks shown in FIGS. 4A-4D and FIGS. 5A-5B may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
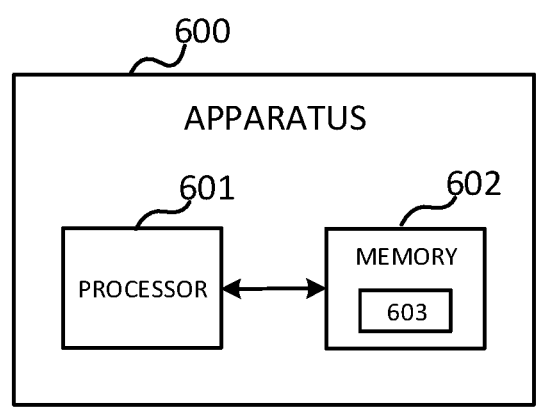
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a terminal device as described with respect to FIG. 4A, FIG. 4C or FIG. 5A, or a network node as described with respect to FIG. 4B, FIG. 4D or FIG. 5B. In such case, the apparatus 600 may be implemented as a terminal device as described with respect to FIG. 4A, FIG. 4C or FIG. 5A, or a network node as described with respect to FIG. 4B, FIG. 4D or FIG. 5B.

In some implementations, the one or more memories 602 and the computer program codes 603 may be configured to, with the one or more processors 601, cause the apparatus 600 at least to perform any operation of the method as described in connection with FIG. 4A, FIG. 4C or FIG. 5A. In other implementations, the one or more memories 602 and the computer program codes 603 may be configured to, with the one or more processors 601, cause the apparatus 600 at least to perform any operation of the method as described in connection with FIG. 4B, FIG. 4D or FIG. 5B. Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Various embodiments of the present disclosure provide an apparatus for random access. The apparatus may comprise a transmitting unit and a receiving unit. In an exemplary embodiment, the apparatus may be implemented in a terminal device such as a UE. The transmitting unit may be operable to carry out the operation in block 412, and the receiving unit may be operable to carry out the operation in block 414. Optionally, the transmitting unit and/or the receiving unit may be operable to carry out more or less operations to implement the proposed methods according to the exemplary embodiments of the present disclosure.

Various embodiments of the present disclosure provide an apparatus for random access. The apparatus may comprise a receiving unit and a transmitting unit. In an exemplary embodiment, the apparatus may be implemented in a network node such as a base station. The receiving unit may be operable to carry out the operation in block 422, and the transmitting unit may be operable to carry out the operation in block 424. Optionally, the receiving unit and/or the transmitting unit may be operable to carry out more or less operations to implement the proposed methods according to the exemplary embodiments of the present disclosure.

Various embodiments of the present disclosure provide an apparatus for random access. The apparatus may comprise a transmitting unit and a receiving unit. In an exemplary embodiment, the apparatus may be implemented in a terminal device such as a UE. The transmitting unit may be operable to carry out the operation in block 432 and/or block 436, and the receiving unit may be operable to carry out the operation in block 434. Optionally, the transmitting unit and/or the receiving unit may be operable to carry out more or less operations to implement the proposed methods according to the exemplary embodiments of the present disclosure.

Various embodiments of the present disclosure provide an apparatus for random access. The apparatus may comprise a receiving unit and a transmitting unit. In an exemplary embodiment, the apparatus may be implemented in a network node such as a base station. The receiving unit may be operable to carry out the operation in block 442 and/or block 446, and the transmitting unit may be operable to carry out the operation in block 444. Optionally, the receiving unit and/or the transmitting unit may be operable to carry out more or less operations to implement the proposed methods according to the exemplary embodiments of the present disclosure.

Various embodiments of the present disclosure provide an apparatus for random access. The apparatus may comprise a first transmitting unit and a second transmitting unit. In an exemplary embodiment, the apparatus may be implemented in a terminal device such as a UE. The first transmitting unit may be operable to carry out the operation in block 512, and the second transmitting unit may be operable to carry out the operation in block 514. In some implementations, the first transmitting unit and the second transmitting unit may be implemented as a single transmitting unit. Optionally, the first transmitting unit and/or the second transmitting unit may be operable to carry out more or less operations to implement the proposed methods according to the exemplary embodiments of the present disclosure.

Various embodiments of the present disclosure provide an apparatus for random access. The apparatus may comprise a first receiving unit and a second receiving unit. In an exemplary embodiment, the apparatus may be implemented in a network node such as a base station. The first receiving unit may be operable to carry out the operation in block 522, and the second receiving unit may be operable to carry out the operation in block 524. In some implementations, the first receiving unit and the second receiving unit may be implemented as a single receiving unit. Optionally, the first receiving unit and/or the second receiving unit may be operable to carry out more or less operations to implement the proposed methods according to the exemplary embodiments of the present disclosure.

Figure 7:
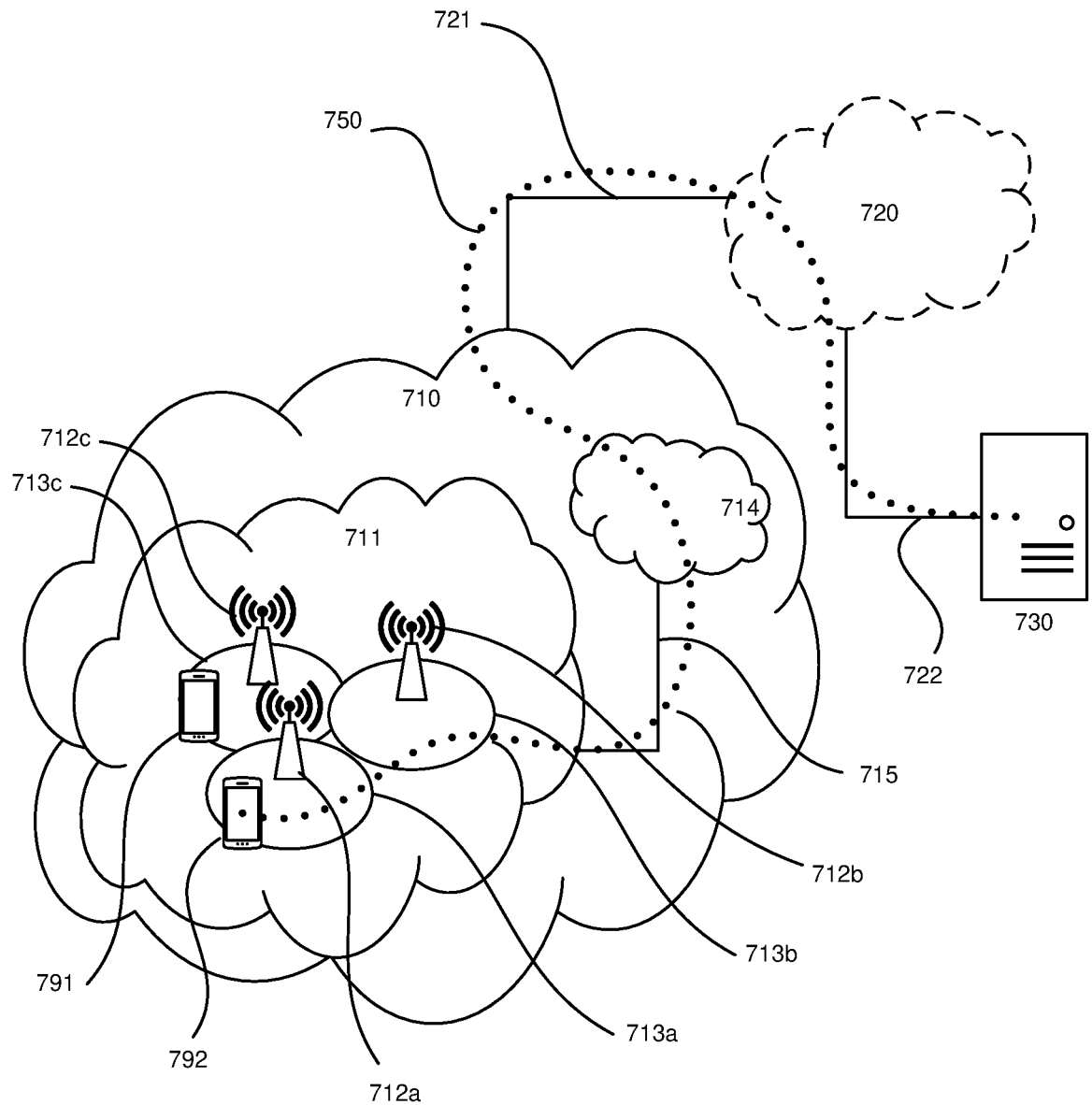
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
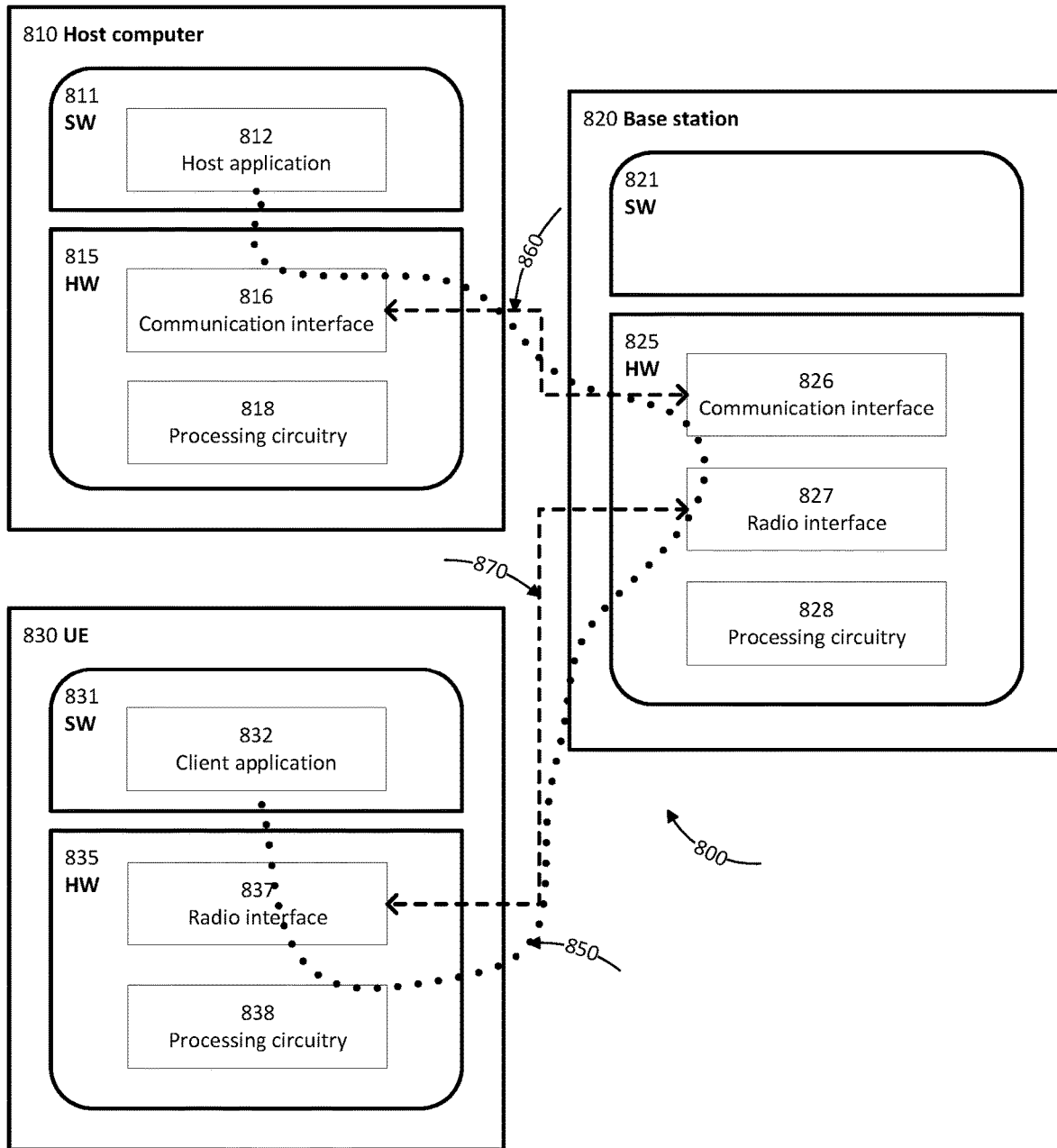
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
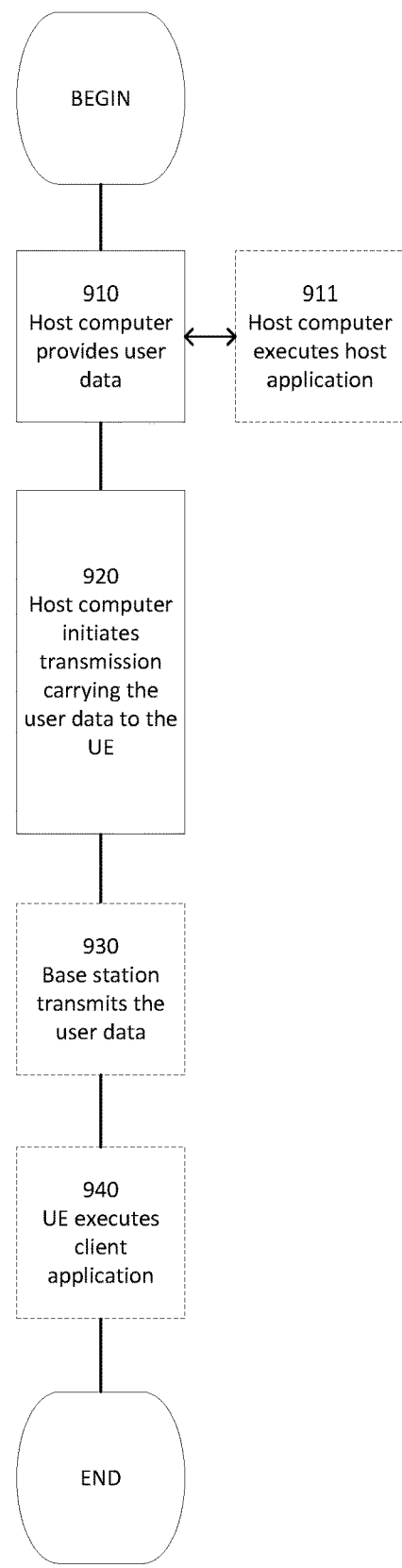
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
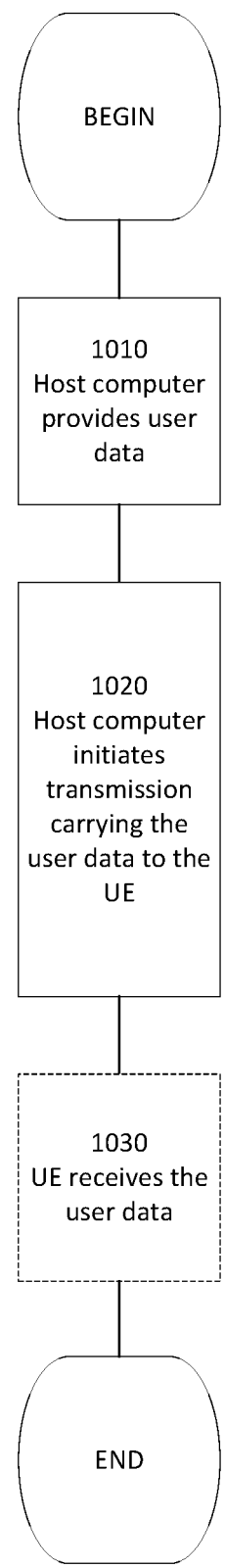
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
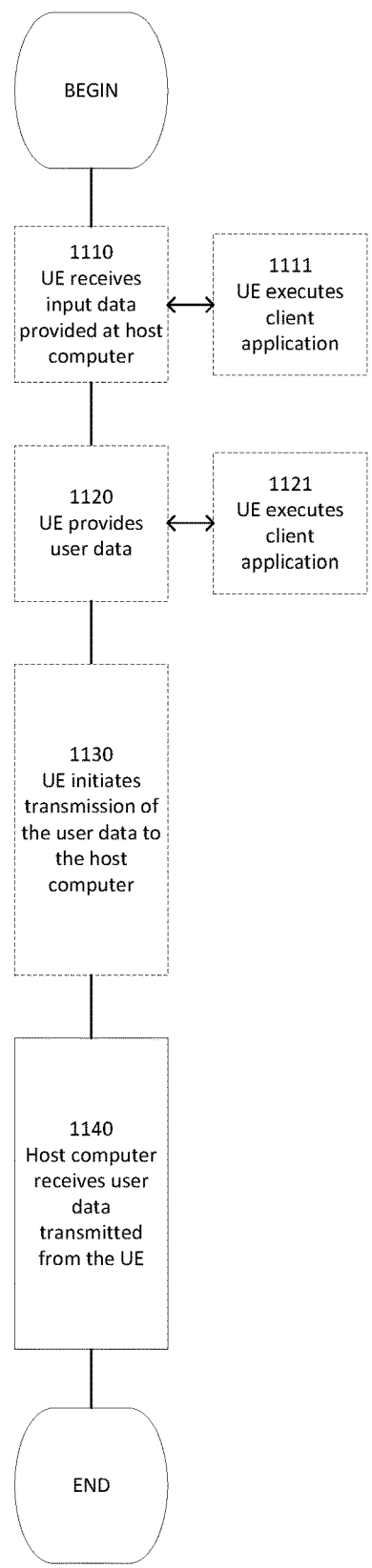
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
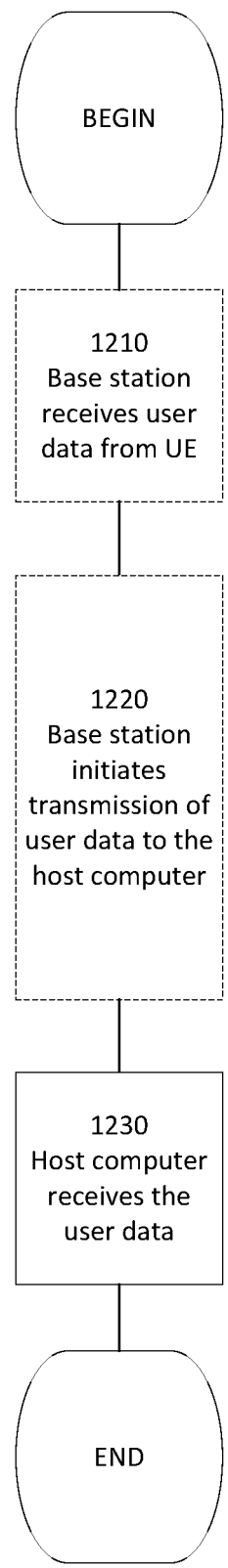
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 420 as describe with respect to FIG. 4B, or any step of the exemplary method 440 as describe with respect to FIG. 4D, or any step of the exemplary method 520 as describe with respect to FIG. 5B.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 420 as describe with respect to FIG. 4B, or any step of the exemplary method 440 as describe with respect to FIG. 4D, or any step of the exemplary method 520 as describe with respect to FIG. 5B.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 410 as describe with respect to FIG. 4A, or any step of the exemplary method 430 as describe with respect to FIG. 4C, or any step of the exemplary method 510 as describe with respect to FIG. 5A.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 410 as describe with respect to FIG. 4A, or any step of the exemplary method 430 as describe with respect to FIG. 4C, or any step of the exemplary method 510 as describe with respect to FIG. 5A.

According to some exemplary embodiments, there is provided a method implemented in a communication system which may include a host computer, a base station and a UE. The method may comprise, at the host computer, receiving user data transmitted to the base station from the UE which may perform any step of the exemplary method 410 as describe with respect to FIG. 4A, or any step of the exemplary method 430 as describe with respect to FIG. 4C, or any step of the exemplary method 510 as describe with respect to FIG. 5A.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 410 as describe with respect to FIG. 4A, or any step of the exemplary method 430 as describe with respect to FIG. 4C, or any step of the exemplary method 510 as describe with respect to FIG. 5A.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 420 as describe with respect to FIG. 4B, or any step of the exemplary method 440 as describe with respect to FIG. 4D, or any step of the exemplary method 520 as describe with respect to FIG. 5B.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 420 as describe with respect to FIG. 4B, or any step of the exemplary method 440 as describe with respect to FIG. 4D, or any step of the exemplary method 520 as describe with respect to FIG. 5B.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, the method comprising:
   performing a transmission of a message to a network node in a random access procedure, wherein the transmission of the message comprises transmission of a preamble and transmission of a payload on a shared channel;
   receiving a response message from the network node, the response message comprising:
      an identifier of the preamble;
      one or more responses intended for one or more terminal devices, respectively; and
      information about a radio network temporary identifier to indicate a retransmission of the payload on the shared channel; and
   performing the retransmission of the payload on the shared channel to the network node in response to the response message, wherein the retransmission is according to retransmission configuration comprising:

a resource configuration indicated by predetermined configuration information for the terminal device, and wherein a redundancy version indicated by the predetermined configuration information is used for the retransmission of the payload; and a resource configuration indicated by the response message.

2. The method of claim 1, wherein the response message is received on a downlink shared channel.

3. The method of claim 1, wherein the retransmission configuration is different from configuration for the transmission of the message.

4. The method of claim 1, wherein the retransmission configuration further indicates:

the preamble identifier; and/or a shared channel time-frequency resource.

5. The method of claim 1, wherein the shared channel comprises a physical uplink shared channel.

6. The method of claim 1, wherein the response message comprises a fallback Random Access Response (RAR).

7. A terminal device, comprising:

processing circuitry comprising one or more processors; and memory comprising instructions executable by the processing circuitry whereby the terminal device is operative to:

perform a transmission of a message to a network node in a random access procedure, wherein the transmission of the message comprises transmission of a preamble and transmission of a payload on a shared channel;

receive a response message from the network node, the response message comprising:

an identifier of the preamble;

one or more responses intended for one or more terminal devices, respectively; and information about a radio network temporary identifier to indicate a retransmission of the payload on the shared channel; and perform the retransmission of the payload on the shared channel to the network node in response to the response message, wherein the retransmission is according to retransmission configuration comprising:

a resource configuration indicated by predetermined configuration information for the terminal device, and wherein a redundancy version indicated by the predetermined configuration information is used for the retransmission of the payload; and a resource configuration indicated by the response message.

8. A method performed by a network node, the method comprising:

receiving, at least partly, a transmission of a message from a terminal device in a random access procedure, wherein the transmission of the message comprises transmission of a preamble and transmission of a payload on a shared channel;

transmitting a response message to the terminal device, the response message comprising:

an identifier of the preamble;

one or more responses intended for one or more terminal devices, respectively; and information about a radio network temporary identifier to indicate a retransmission of the payload on the shared channel; and receiving the retransmission of the payload on the shared channel from the terminal device in response to the response message, wherein the retransmission is according to retransmission configuration comprising:

a resource configuration indicated by predetermined configuration information for the terminal device, and wherein a redundancy version indicated by the predetermined configuration information is used for the retransmission of the payload; and a resource configuration indicated by the response message.

9. The method of claim 8, wherein the response message is transmitted on a downlink shared channel.

10. The method of claim 8, wherein the retransmission configuration is different from configuration for the transmission of the message.

11. The method of claim 8, wherein the retransmission configuration further indicates:

the preamble identifier; and/or a shared channel time-frequency resource.

* * * * *